United States Patent
Nagao

(10) Patent No.: US 11,203,209 B2
(45) Date of Patent: Dec. 21, 2021

(54) ELECTRONIC DEVICE, OPERATION METHOD AND RECORDING MEDIUM

(71) Applicant: CASIO COMPUTER CO., LTD., Tokyo (JP)

(72) Inventor: Tomoyuki Nagao, Fussa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 16/803,605

(22) Filed: Feb. 27, 2020

(65) Prior Publication Data

US 2020/0276832 A1    Sep. 3, 2020

(30) Foreign Application Priority Data

Feb. 28, 2019    (JP) .............................. JP2019-035861

(51) Int. Cl.

| | |
|---|---|
| *B41J 2/01* | (2006.01) |
| *B41J 3/407* | (2006.01) |
| *A45D 29/22* | (2006.01) |
| *G06T 7/13* | (2017.01) |
| *G06T 7/70* | (2017.01) |
| *G06K 9/32* | (2006.01) |
| *A45D 29/00* | (2006.01) |

(52) U.S. Cl.
CPC ............ *B41J 3/4073* (2013.01); *A45D 29/22* (2013.01); *B41J 2/01* (2013.01); *G06K 9/32* (2013.01); *G06T 7/13* (2017.01); *G06T 7/70* (2017.01); *A45D 2029/005* (2013.01)

(58) Field of Classification Search
None
See application file for complete search history.

(56) References Cited

U.S. PATENT DOCUMENTS

| | | | | |
|---|---|---|---|---|
| 4,652,765 A | * | 3/1987 | Nishihara | ............ G01B 11/028 250/202 |
| 6,129,464 A | * | 10/2000 | Nakamura | ............. B41J 19/202 400/279 |
| 2009/0256615 A1 | * | 10/2009 | Suzuki | ................... B41J 11/008 327/298 |

(Continued)

FOREIGN PATENT DOCUMENTS

JP    H 11-56452 A    3/1999

*Primary Examiner* — Erica S Lin
*Assistant Examiner* — Tracey M McMillion
(74) *Attorney, Agent, or Firm* — Fitch, Even, Tabin & Flannery LLP

(57) ABSTRACT

An electronic device includes a moving body, first and second sensors, and a processor. The first sensor detects the moving body passing a reference position while moving along a first axis. The second sensor outputs a second phase signal of a second phase according to the moving body moving along the first axis, wherein the second phase is shifted from a first phase. In a setting mode, the processor stores information data indicating a level of the second phase signal at a time when the first sensor detects the reference position. In an operation control mode, the processor sets, as a position pertaining to an origin on the first axis, a position of an earliest edge of the first phase after the second phase signal switches from a level identical with the level stored in the setting mode to a different level after the first sensor detects the reference position.

6 Claims, 13 Drawing Sheets

(56) References Cited

U.S. PATENT DOCUMENTS

2011/0125456 A1* 5/2011 Kurumado ............ G01P 13/045
   702/147
2012/0182336 A1* 7/2012 Itoh ........................ B41J 25/003
   347/8

* cited by examiner

WHEN LEVEL CHANGE OF SIGNAL OF FIRST SENSOR
IS EARLIER THAN EDGE γ OF A-PHASE PULSE SIGNAL IN INITIAL SETTING (S11; YES)

WHEN LEVEL CHANGE OF SIGNAL OF FIRST SENSOR
IS LATER THAN EDGE γ OF A-PHASE PULSE SIGNAL IN INITIAL SETTING (S11; YES)

WHEN LEVEL CHANGE OF SIGNAL OF FIRST SENSOR
IS EARLIER THAN EDGE γ OF A-PHASE PULSE SIGNAL IN MOVEMENT IN X DIRECTION (−)
AFTER INITIAL SETTING

WHEN LEVEL CHANGE OF SIGNAL OF FIRST SENSOR
IS LATER THAN EDGE γ OF A-PHASE PULSE SIGNAL IN MOVEMENT IN X DIRECTION (−)
AFTER INITIAL SETTING

WHEN LEVEL CHANGE OF SIGNAL OF FIRST SENSOR
IS EARLIER THAN EDGE β OF A-PHASE PULSE SIGNAL IN INITIAL SETTING (S11; NO)

WHEN LEVEL CHANGE OF SIGNAL OF FIRST SENSOR
IS LATER THAN EDGE β OF A-PHASE PULSE SIGNAL IN INITIAL SETTING (S11; NO)

WHEN LEVEL CHANGE OF SIGNAL OF FIRST SENSOR IS
EARLIER THAN EDGE β OF A-PHASE PULSE SIGNAL IN MOVEMENT IN X DIRECTION (−)
AFTER INITIAL SETTING

WHEN LEVEL CHANGE OF SIGNAL OF FIRST SENSOR IS
LATER THAN EDGE β OF A-PHASE PULSE SIGNAL IN MOVEMENT IN X DIRECTION (−)
AFTER INITIAL SETTING

ELECTRONIC DEVICE, OPERATION METHOD AND RECORDING MEDIUM

CROSS-REFERENCE TO RELATED APPLICATIONS

This application is based upon and claims the benefit of priority from the prior Japanese Patent Application No. 2019-035861, filed Feb. 28, 2019, the entire contents of which are incorporated herein by reference.

BACKGROUND OF THE INVENTION

1. Field of the Invention

The present disclosure relates to an electronic device, an operation method, and a recording medium.

2. Description of the Related Art

There is known a drawing device that draws various designs on nails or nail tips. (See, for example, JPH 11-56452 A).

The drawing device includes a drawing head that moves with respect to the nail of a finger or the like fixed to the drawing device. The drawing device can accurately draw desired designs on nails or nail tips by accurately controlling the position of the drawing head.

SUMMARY OF THE INVENTION

In order to control the position of the drawing head, it is essential to obtain the most accurate possible position information.

However, even for a drawing device capable of obtaining position information with sufficiently high resolution, it is difficult to obtain accurate position information over a long period of time stably because physical deformation occurs therein owing to, for example, change in environment (e.g. temperature, humidity, etc.) or aging. This applies to not only drawing devices but also any type of electronic device that performs position control.

In view of the above circumstances, advantages of an aspect of the present invention include providing a technology that realizes excellent operation of an electronic device.

According to an aspect of the present invention, there is provided an electronic device including:

a moving body that moves along a first axis;

a first sensor that detects the moving body passing a reference position while moving along the first axis;

a second sensor that outputs a second phase signal of a second phase according to the moving body moving along the first axis, wherein the second phase is shifted from a first phase; and a processor that:

in a setting mode, stores information data indicating a level of the second phase signal at a time when the first sensor detects the reference position; and in an operation control mode, sets, as a position pertaining to an origin on the first axis, a position of an earliest edge of the first phase after the second phase signal switches from a level identical with the level of the second phase signal indicated by the information data stored in the setting mode to a different level after the first sensor detects the reference position.

BRIEF DESCRIPTION OF THE DRAWINGS

The accompanying drawings, which are incorporated in and constitute a part of the specification, illustrate embodiments, and together with the general description given above and the detailed description of the embodiments given below, serve to explain the principles of the present invention, wherein.

DETAILED DESCRIPTION OF THE PREFERRED EMBODIMENTS

Figure 1:
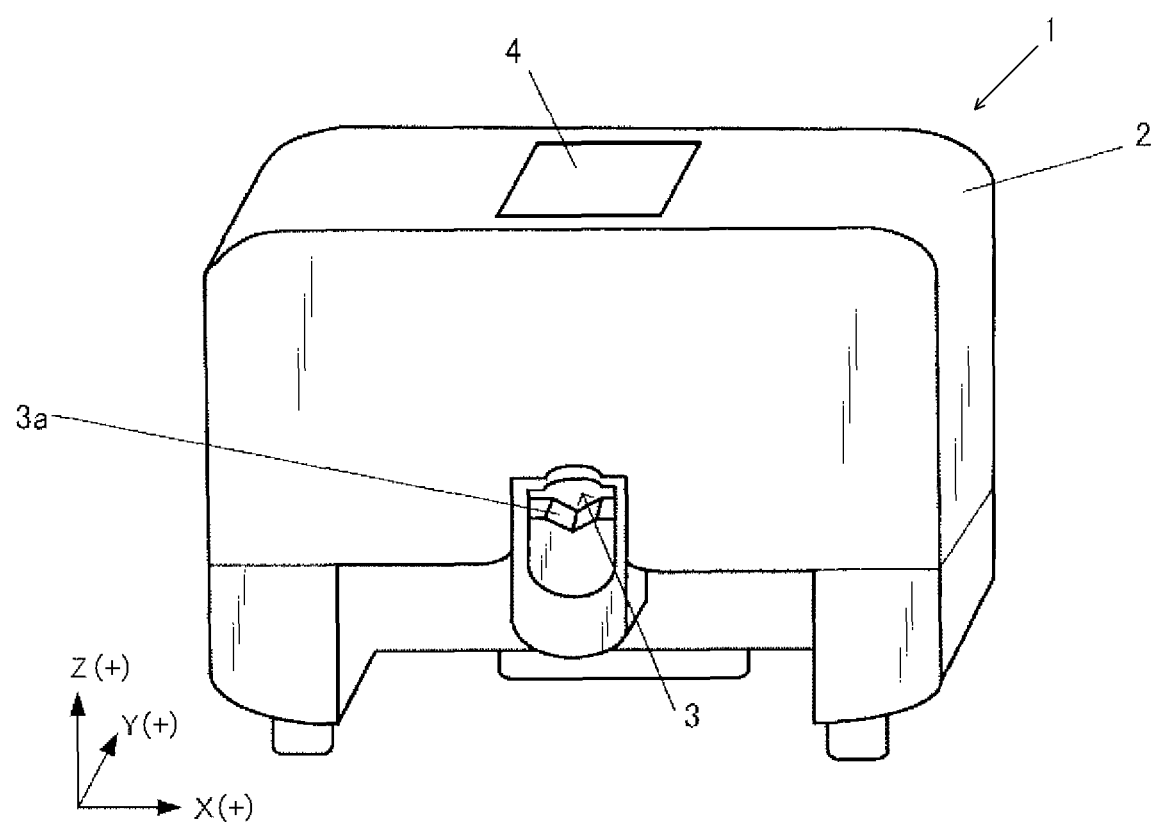
FIG. 1 shows an external appearance of a drawing device 1 according to an embodiment(s)

FIG. 1 shows an external appearance of a drawing device (electronic device) having a position setting device according to an embodiment(s). The drawing device 1 shown in FIG. 1 is an inkjet drawing device as an example of an electronic device that performs position control; or to be more specific, a nail printer that draws designs on nails or nail tips attached to nails. Hereinafter, designs drawn on nails or nail tips are referred to as nail designs.

As shown in FIG. 1, the drawing device 1 is a compact box-shaped device and has an opening 3 formed in the front surface of a case 2 and where a finger is inserted. In the opening 3, a finger rest 3a where a finger is placed is provided. The drawing device 1 includes a display 4 provided on the upper surface of the case 2 and used, for example, for selecting a nail design. When the drawing device 1 is a drawing device that draws nail designs by receiving data of the nail designs from an external electronic device having a display, such as a smartphone, the drawing device 1 does not need to have the display 4.

The display 4 may be a liquid crystal display or an organic electroluminescent (OEL) display. The display 4 may include a touchscreen and have an input function in addition to a display function.

In this specification, the surface where the opening 3 is formed in the drawing device 1 is defined as the front surface. Further, an orthogonal XYZ coordinate system is defined as shown in FIG. 1, and the direction of X-axis (first axis), the direction of Y-axis (second axis), and the direction of Z-axis, which are orthogonal to one another, may be referred to, as needed, as a main-scanning direction, a sub-scanning direction, and a height direction, respectively.

Figure 2:
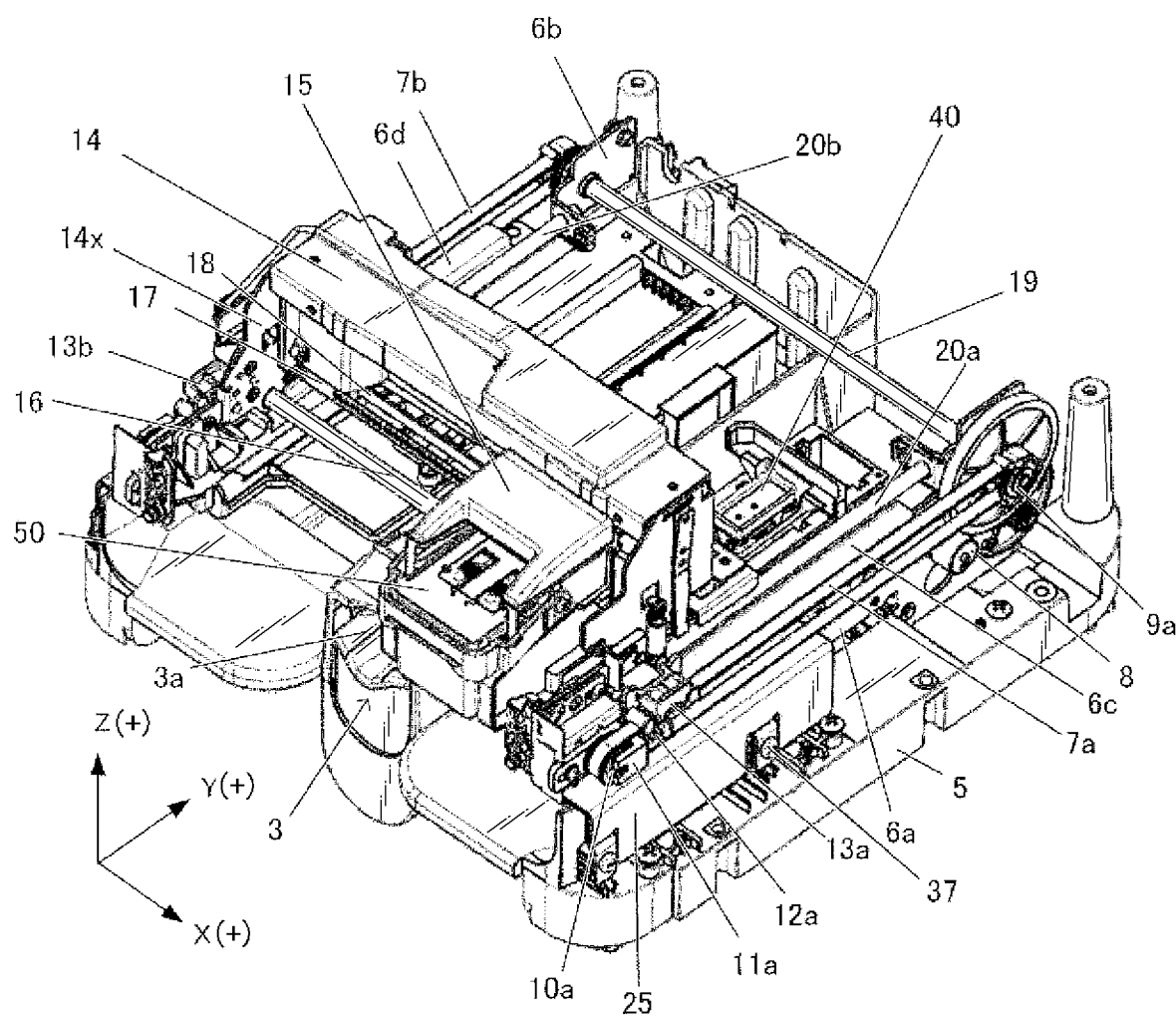
FIG. 2 is a perspective view of the drawing device 1 with the upper part of a case 2 removed.
Figure 3:
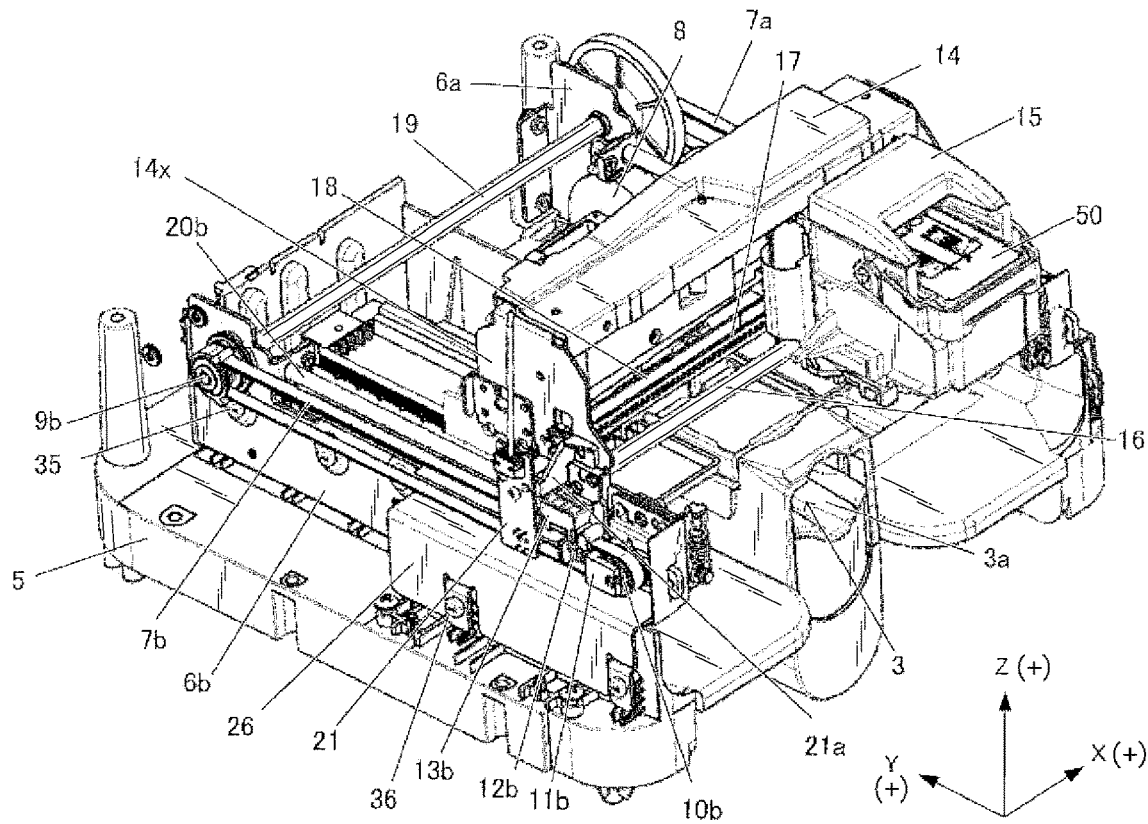
FIG. 3 is a perspective view of the drawing device 1 viewed at an angle different from the perspective view of FIG. 2.
Figure 4:
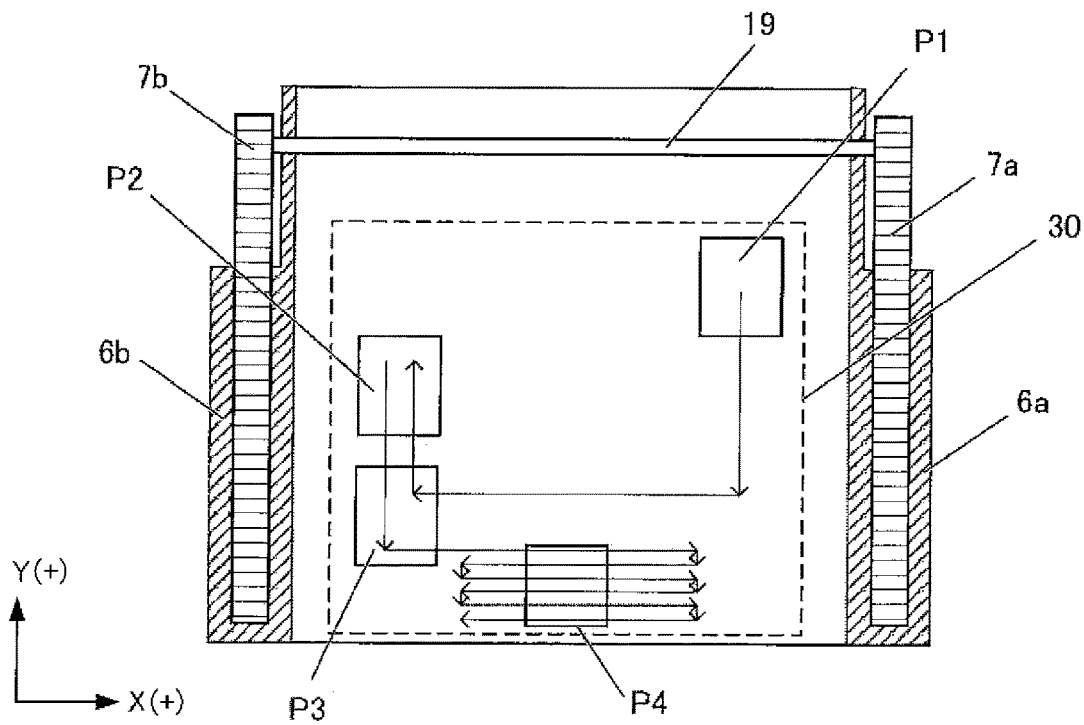
FIG. 4 shows a home position, a wiping position, a purging position, and a drawing position.

FIG. 2 and FIG. 3 are perspective views of the drawing device 1 with the upper part of the case 2 removed, and show the drawing device 1 viewed at different angles. FIG. 4 shows a home position P1, a wiping position P2, a purging position P3, a drawing position P4 where drawing is performed on a nail, and a conveyable region 30 (region enclosed by a dotted line) as a region where an inkjet head 51 can be conveyed by a motor 8 and so forth. As shown in FIG. 2 and FIG. 3, the drawing device 1 includes: a carriage 15 that conveys the inkjet head 51 along the X-axis; and a carriage 14 that conveys the inkjet head 51 along the Y-axis. To the inkjet head 51, an ink cartridge 50 is attached (shown in FIG. 5). Hence, the carriage 14 and the carriage 15 are carriages that convey the inkjet head 51 together with the ink cartridge 50 along the Y-axis and the X-axis, respectively, and are moving bodies that move in their respective directions. They allow the inkjet head 51 to perform printing on the nail of a finger fixed to the drawing position P4 by, as indicated by arrows in FIG. 4, alternately performing scanning in a first direction being a negative (−) direction along the X-axis (left direction in FIG. 4) and scanning in a second direction being a positive (+) direction along the X-axis (right direction in FIG. 4), and, between these, performing scanning along the Y-axis by moving little by little along the Y-axis to adjust its position on the Y-axis. Hereinafter, structure of the drawing device 1 will be described with a focus on operation of the carriages that convey the inkjet head 51. It is noted that the ink cartridge 50 may be separate from the inkjet head 51. As another example of moving bodies, there is a plotter that applies ink to a part by bringing its tip into contact with the part, wherein the part is a noncontact part in the case of using, for example, an inkjet system.

The case 2 of the drawing device 1 has the opening 3 at the center of the front surface of a base 5, and the finger rest 3a is provided in the opening 3. In the upper part of the case 2, the upper part being removed in FIG. 2 and FIG. 3, an imaging device (not shown) is provided. The imaging device is, for example, a camera having an imaging element, such as a CMOS (Complementary Metal-Oxide-Semiconductor) sensor or a CCD (Charge Coupled Device) sensor, and images/photographs a finger placed on the finger rest 3a from above, thereby obtaining a nail image used for, for example, identifying a nail region.

The drawing device 1 includes two frames (frames 6a, 6b) extending along the Y-axis. The frames 6a, 6b are fixed to the base 5 so as to substantially stand up along the YZ plane. To the frames 6a, 6b, guide shafts (guide shafts 20a, 20b) extending along the Y-axis are fixed, respectively. On both lateral surfaces of the carriage 14, insertion parts (not shown) where through holes are formed are provided. The guide shafts 20a, 20b are inserted through the insertion parts. With this structure, the frames 6a, 6b support the carriages 14 via the guide shafts 20a, 20b. As shown in FIG. 2, the frame 6a on the right side of the opening 3 has an auxiliary frame 6c that inclines so as to bend outward (rightward) at a position above a belt 7a, which is described below. Similarly, as shown in FIG. 3, the frame 6b on the left side of the opening 3 has an auxiliary frame 6d that inclines so as to bend toward a side where a position sensor 22 is provided (leftward) at a position above a belt 7b, which is described below. The frame 6b is fixed to the base 5 by a screw 35. A support 25 provided on the front side of the drawing device 1 and projecting outward (rightward) is fixed to the base 5 by a screw 37, and a support 26 provided on the front side of the drawing device 1 and projecting outward (leftward) is fixed to the base 5 by a screw 36.

The frames 6a, 6b support a shaft 19 near the rear end of the drawing device 1. To respective ends of the shaft 19, toothed pulleys 9a, 9b are attached. The toothed pulley 9a is paired with a toothless pulley 10a provided near the front end of the frame 6a. The toothed pulley 9a and the toothless pulley 10a are spanned by the ring-shaped belt 7a with appropriate tension applied by a spring 12a. Similarly, the toothed pulley 9b is paired with a toothless pulley 10b provided near the front end of the frame 6b. The toothed pulley 9b and the toothless pulley 10b are spanned by the ring-shaped belt 7b with appropriate tension applied by a spring 12b. Pulley holders 11a, 11b are holders for the toothless pulleys 10a, 10b, respectively, and fixed to the frames 6a, 6b, respectively.

The toothed pulley 9a is a drive pulley driven by rotation of the motor 8, and the toothed pulley 9b and the toothless pulleys 10a, 10b are driven pulleys. By a gear train provided between the toothed pulley 9a and the motor 8 converting the rotation of the motor 8 into slower rotation, sufficient torque is transmitted from the motor 8 to the toothed pulley 9a.

The motor 8 is, for example, a stepping motor, but may be another motor, such as a DC motor.

The carriage 14 is fixed to the belts 7a, 7b via belt clips 13a, 13b, respectively. Hence, the belts 7a, 7b convey the carriage 14 along the Y-axis as the toothed pulley 9a and the toothed pulley 9b, which is connected to the toothed pulley 9a via the shaft 19, rotate by the rotation of the motor 8. The carriage 14 therefore conveys the inkjet head 51 along the Y-axis.

The carriage 14 is provided with a guide shaft 16 extending along the X-axis, and supports the carriage 15 via the guide shaft 16. More specifically, the carriage 15 has, on the back surface, an insertion part 15a (shown in FIG. 10A) having a through hole, and the guide shaft 16 is inserted through the insertion part 15a.

The carriage 14 is provided with a motor and a pair of pulleys (all not shown). The carriage 14 is further provided with a belt 18 spanned by the pair of pulleys. The belt 18 moves circularly by rotation of the motor. The carriage 15 is fixed to the belt 18. Hence, the belt 18 conveys the carriage 15 along the X-axis as the pulleys rotate by the rotation of the motor. The carriage 15 therefore conveys the inkjet head 51 along the X-axis.

The motor (not shown) is, for example, a DC motor, but may be another motor, such as a stepping motor. An encoder scale 17 provided between the guide shaft 16 and the belt 18 is an encoder scale in which light-transmitting portions and light-blocking portions are alternately arranged along the X-axis, and constitutes a part of an encoder that detects the amount of movement of the carriage 15 along the X-axis.

The drawing device 1 thus configured can convey the inkjet head 51 along the X-axis and the Y-axis independently by the drive of the motors. Hence, the drawing device 1 can perform necessary operation by conveying the inkjet head 51 as appropriate, for example, from the home position P1 to the purging position P3, the wiping position P2, and the drawing position P4 as indicated by the arrows in FIG. 4. Further, the drawing device 1 employs, for position control on the Y-axis, open-loop control using a small stepping motor, and consequently can accurately move the inkjet head 51 along the Y-axis without a position sensor, and employs, for position control on the X-axis, closed-loop control using a DC motor and an encoder, and consequently can perform rapid drawing while moving the inkjet head 51 along the X-axis at a speed higher than a moving speed of the inkjet head 51 along the Y-axis.

The home position P1 is a position where a nozzle surface of the inkjet head 51 is capped with a cap 40 shown in FIG. 2. Because capping with the cap 40 can prevent the nozzle surface from becoming dry, the home position P1 is used as a standby position of the inkjet head 51 when the drawing device 1 is not in use. The wiping position P2 is a position where the nozzle surface is wiped with a wiping member (not shown). Because bringing the nozzle surface into contact with the wiping member to transfer the ink remaining on the nozzle surface to the wiping member and thereby remove the ink from the nozzle surface can prevent the ink from fixing on the nozzle surface, the wiping position P2 is used as a maintenance position where the inkjet head 51 receives maintenance. The purging position P3 is a position where the inkjet head 51 forcibly discharges ink into a waste ink tank (shown in FIG. 8). Because forcibly discharging ink unnecessarily remaining after drawing finishes or forcibly discharging ink before drawing starts can prevent nozzles from being clogged with ink, the purging position P3 is used as another maintenance position where the inkjet head 51 receives maintenance. The drawing position P4 is a position where drawing on a nail starts.

Figure 5:
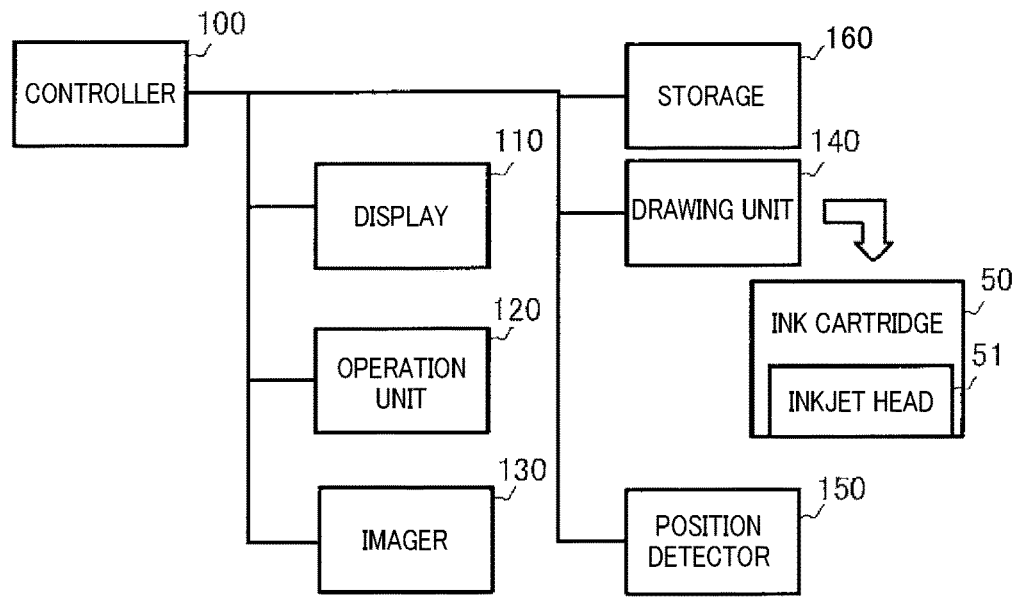
FIG. 5 is a block diagram showing functional configuration of the drawing device 1.
Figure 6:
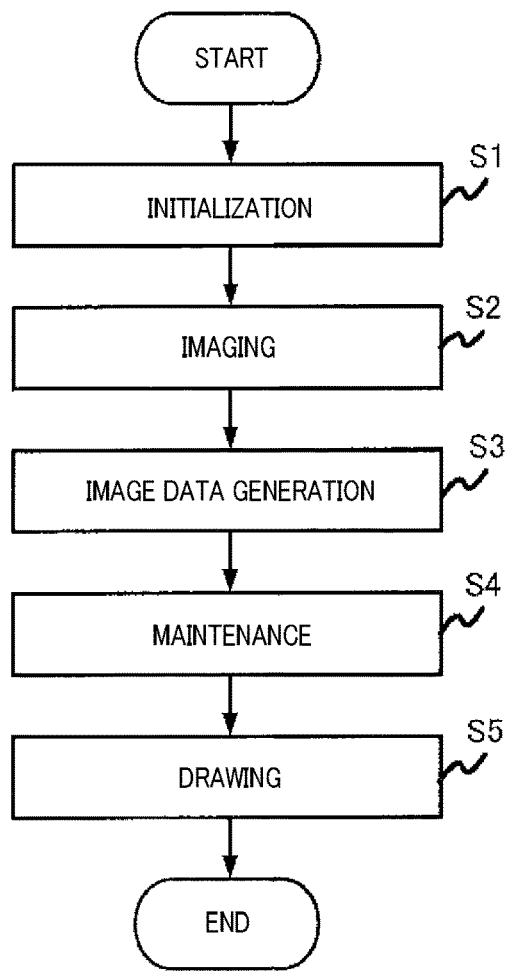
FIG. 6 is a flowchart of a process that is performed by the drawing device 1.

FIG. 5 is a diagram showing functional configuration of the drawing device 1. FIG. 6 is a flowchart of a process that is performed by the drawing device 1. Hereinafter, with reference to FIG. 5 and FIG. 6, a basic process that is performed by the drawing device 1 will be described. The basic process is a process from initialization, which is performed after power is on, to drawing.

As shown in FIG. 5, the drawing device 1 includes a controller 100 (processor), a display 110, an operation unit 120, an imager 130, a drawing unit 140, a position detector 150, and a storage 160. The drawing device 1 performs the process shown in FIG. 6 with the controller 100 executing a program(s) stored in the storage 160.

The controller 100 controls operation of the drawing device 1. The controller 100 is an electronic circuit(s) that includes, for example: a processing circuit(s), such as a CPU (Central Processing Unit); and storage circuits, such as a RAM (Random Access Memory) and a ROM (Read Only Memory), as the storage 160, and is constructed on one or more control boards. The display 110 includes, for example, the display 4, and displays nail designs and so forth. The operation unit 120 includes, for example, the touchscreen provided on the display 4, and is used, for example, for selecting a nail design. The imager 130 includes, for example, the imaging device, and obtains nail images. The drawing unit 140 includes, for example, the inkjet head 51 and the mechanism that conveys the inkjet head 51, and draws desired nail designs by controlling the inkjet head 51 to eject ink supplied from the ink cartridge 50. The position detector 150 includes, for example, an encoder and an origin sensor unit(s), and detects a coordinate(s) of the position of the carriage 15 (inkjet head 51) as a counter value(s).

When powered, the drawing device 1 starts the process shown in FIG. 6. The drawing device 1 first performs initialization (Step S1). The drawing device 1 does not know where the inkjet head 51 is located immediately after powered. Hence, in order to detect the origin position, the controller 100 causes the drawing unit 140 to convey the inkjet head 51, and detects the origin position on the basis of output of the position detector 150. When detecting the origin position, the controller 100 causes the drawing unit 140 to convey the inkjet head 51 to the home position P1 so that the inkjet head 51 is capped.

Next, when a user of the drawing device 1 selects a nail design, the drawing device 1 images a nail of the user (Step S2). In this embodiment, the controller 100 outputs an imaging instruction to the imager 130 to cause the imager 130 to image the nail of a finger placed on the finger rest 3a.

When the imager 130 images the nail, the drawing device 1 generates image data for drawing the nail design on the nail (Step S3). In this embodiment, the controller 100 detects the contour of the nail on the basis of the image of the nail obtained in Step S2, and generates nail information including the size and the shape of the nail. The controller 100 corrects, on the basis of the nail information, image data of the nail design selected by the user, thereby generating the image data for drawing.

When the controller 100 generates the image data for drawing, the drawing device 1 performs maintenance (Step S4). In this embodiment, as indicated by the arrows in FIG. 4, the controller 100 causes the drawing unit 140 to convey the inkjet head 51 to the purging position P3 and the wiping position P2 in this order, and performs purging and wiping at their respective positions. Thereafter, the controller 100 causes the drawing unit 140 to convey the inkjet head 51 to the drawing position P4.

Finally, the drawing device 1 draws the nail design on the nail (Step S5). In this embodiment, the controller 100 controls the inkjet head 51 on the basis of the image data generated in Step S3, thereby causing the drawing unit 140 to draw the nail design. The inkjet head 51 is accurately located at positions each defined by the X-axis and the Y-axis so as to be always arranged in the conveyable region 30 from Step S1 to Step S5.

By performing the above process, the drawing device 1 can draw a desired nail design selected by a user thereof on a nail of the user. The drawing device 1 can draw desired nail designs by accurately recognizing and controlling the position of the inkjet head 51.

Hereinafter, components that realize the position control will be described in more detail.

Figure 7:
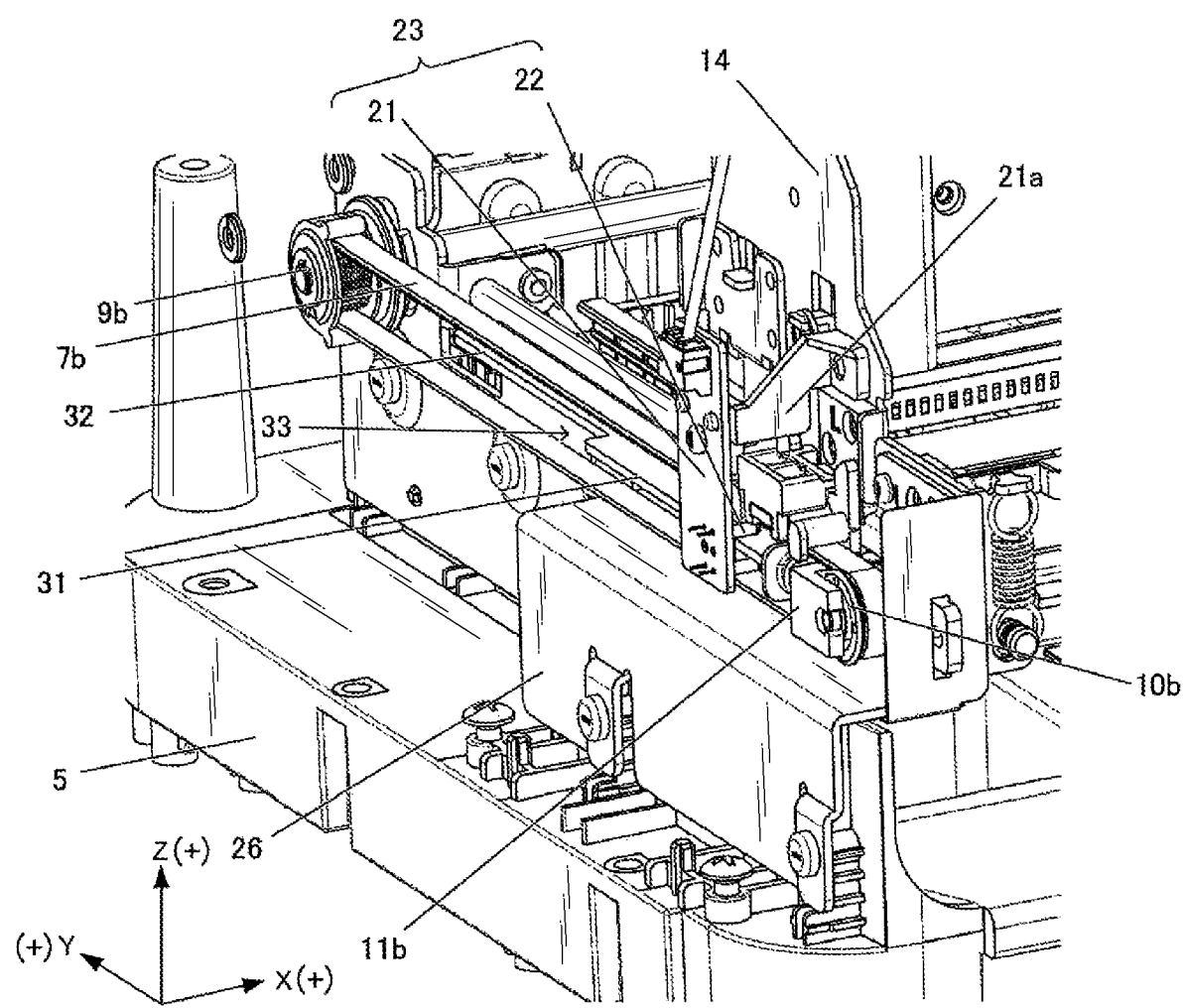
FIG. 7 is an enlarged perspective view of a Y-axis origin sensor unit 23 and its surrounding components of the drawing device 1.
Figure 8:
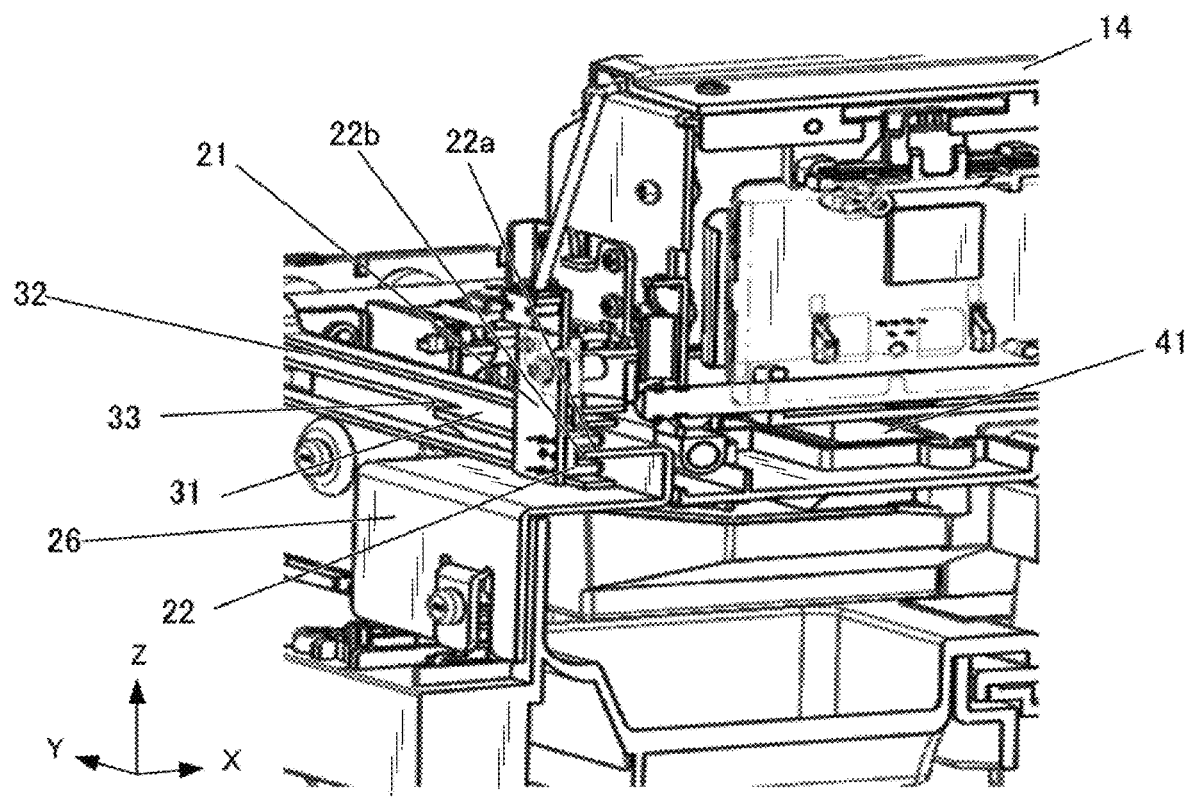
FIG. 8 is a cross-sectional view of the drawing device 1 taken along XZ plane.

FIG. 7 is an enlarged perspective view of a Y-axis origin sensor unit 23 and its surrounding components of the drawing device 1. FIG. 8 is a cross-sectional view of the drawing device 1 taken along the XZ plane, and shows the Y-axis origin sensor unit 23 cut along the XZ plane. With reference to FIG. 7 and FIG. 8, components related to the position control of the inkjet head 51 on the Y-axis will be described.

As shown in FIG. 7, the Y-axis origin sensor unit 23 includes a circuit board 21 and a third sensor 22 that is a photointerrupter. On the circuit board 21, a processing circuit that processes signals output from the third sensor 22 may be constructed. The third sensor 22 is an optical sensor, and, as shown in FIG. 8, includes: a light-emitting surface 22a on which a light-emitting element(s) is provided; and a light-receiving surface 22b on which a light-receiving element(s) is provided. The light-receiving element of the light-receiving surface 22b receives light from the light-emitting element of the light-emitting surface 22a. The light-emitting element of the light-emitting surface 22a is, for example, an LED, and the light-receiving element of the light-receiving surface 22b is, for example, a photodiode. The light-emitting surface 22a and the light-receiving surface 22b are of the inner surface of the third sensor 22 and face one another. In FIG. 8, the light-emitting surface 22a is on the upper side and the light-receiving surface 22b is on the lower side, but they may be reversed.

The Y-axis origin sensor unit 23 detects a position pertaining to the origin on the Y-axis on the basis of change in the amount of light according to the movement of the inkjet head 51 on the Y-axis, the amount of light being received by the light-receiving surface 22b. More specifically, the Y-axis origin sensor unit 23 detects the position pertaining to the origin on the Y-axis by detecting a state change between (from/to) a light-receiving state in which light from the light-emitting element of the light-emitting surface 22a is received by the light-receiving element of the light-receiving surface 22b and (to/from) a light-blocking state in which the light is blocked between the light-emitting element of the light-emitting surface 22a and the light-receiving element of the light-receiving surface 22b and accordingly is not received by the light-receiving element of the light-receiving surface 22b. The position pertaining to the origin on the Y-axis, which is the position at which the state change between the light-receiving state and the light-blocking state has been detected, may be treated as the position of the origin (i.e. origin position) on the Y-axis or as a position obtained by adding a predetermined coordinate value to the coordinate of the origin position on the Y-axis.

As shown in FIG. 7, the Y-axis origin sensor unit 23 is fixed to the outer surface of a lateral-surface plate 14x of the carriage 14 via a board fixing plate 21a. The board fixing plate 21a extends from a lateral surface of the carriage 14 outward, which is outside the conveyable region 30 for the inkjet head 51 shown in FIG. 4, and supports the Y-axis origin sensor unit 23 outside the conveyable region 30. More specifically, the board fixing plate 21a supports the circuit board 21, and the third sensor 22 is attached to the circuit board 21, which is supported by the board fixing plate 21a. The third sensor 22, which is attached to the circuit board 21, is attached to a surface of the circuit board 21 closer to an inter-frame region sandwiched between the frames 6a, 6b, and projects into the ring formed by the belt 7b.

As shown in FIG. 7 and FIG. 8, the upper end part of the support 26 forms a first projection 31 and a second projection 32 that project outward. The first projection 31 and the second projection 32 have different amounts of outward projection, and a border part 33 is formed at the border between these. The first projection 31, the second projection 32, and the border part 33 are arranged in the ring formed by the belt 7b. The first projection 31 projects outward greater than the second projection 32, and functions as a light blocker that blocks light by being present between the light-emitting surface 22a and the light-receiving surface 22b of the third sensor 22 that projects into the ring. The second projection 32 projects outward less than the first projection 31, and is shaped so as to be notched. The second projection 32 does not function as the light blocker because it does not project so as to be present between the light-emitting surface 22a and the light-receiving surface 22b. In FIG. 7, the first projection 31 is in front of the second projection 32, namely closer to the front side of the drawing device 1, but may be behind the second projection 32, namely closer to the rear side of the drawing device 1. In the case, the state change between the light-receiving state and the light-blocking state is reversed from that in the case shown in FIG. 7. In either case, the second projection 32 functions as a light projector no matter whether it projects or not. That is, the second projection 32 may not be provided.

In the drawing device 1, when the motor 8 rotates, the carriage 14 moves along the Y-axis, and accordingly the Y-axis origin sensor unit 23 fixed to the carriage 14 moves along the Y-axis. That is, the third sensor 22 including the light-emitting surface 22a and the light-receiving surface 22b moves along the Y-axis in the ring formed by the belt 7b. When the Y-axis origin sensor unit 23 moves from a region where the first projection 31 exists, namely where the first projection 31 is present between the light-emitting surface 22a and the light-receiving surface 22b, to a region where the first projection 31 does not exist, or from the region where the first projection 31 does not exist to the region where the first protrusion 31 exists, the Y-axis origin sensor unit 23 detects the state change between the light-receiving state and the light-blocking state. Thus, the Y-axis origin sensor unit 23 detects the position pertaining to the origin on the Y-axis. That is, the Y-axis origin sensor unit 23 can detect the origin position on the Y-axis on the basis of its passing the border part 33.

The drawing device 1 controls the position of the inkjet head 51 on the Y-axis by controlling the number of pulses to be input to the stepping motor, taking the origin position on the Y-axis detected by the Y-axis origin sensor unit 23 as a reference position for the inkjet head 51 to move along the Y-axis.

Figure 9:
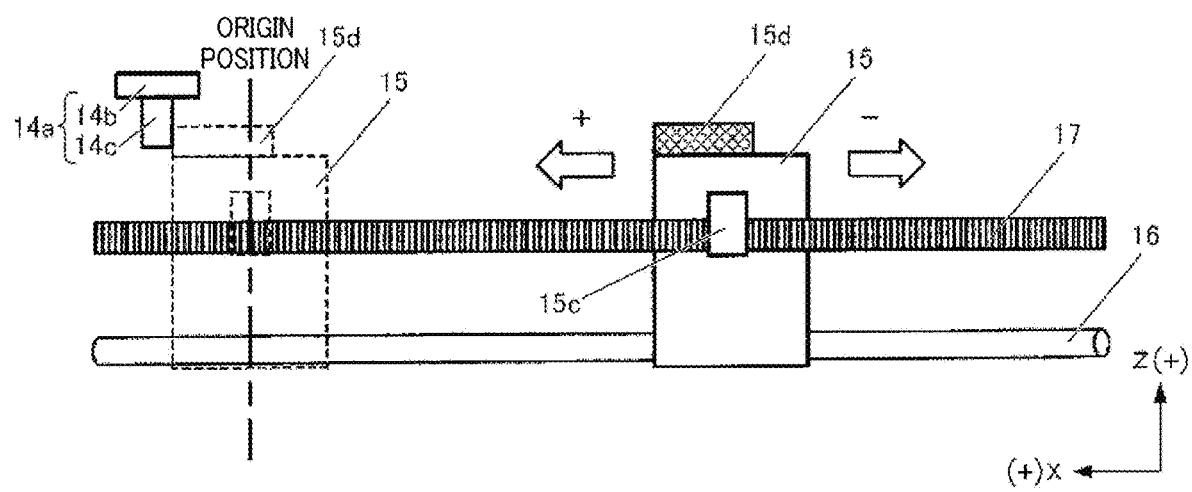
FIG. 9 is a schematic view showing the interior of a carriage 14 to which a carriage 15 is attached, viewed from the back.
Figure 10A:
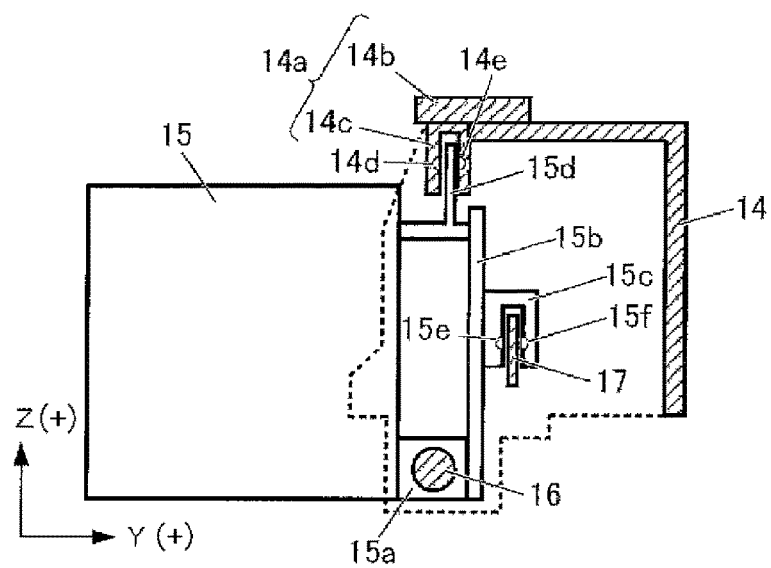
FIG. 10A is a cross-sectional view of the carriage 14 to which the carriage 15 is attached, taken along YZ plane.
Figure 10B:
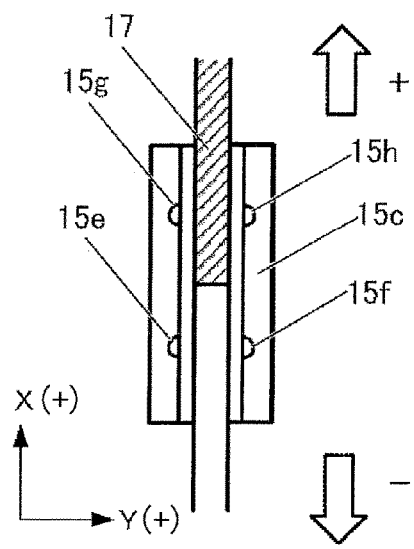
FIG. 10B is a cross-sectional view of the carriage 15 and an encoder scale 17, taken along XY plane.

FIG. 9 is a schematic view showing the interior of the carriage 14 to which the carriage 15 is attached, viewed from the back (rear side of the drawing device 1). FIG. 10A is a cross-sectional view of the carriage 14 to which the carriage 15 is attached, taken along the YZ plane. FIG. 10B is a cross-sectional view of a second sensor 15c and the encoder scale 17, taken along the XY plane. With reference to FIG. 9, FIG. 10A, and FIG. 10B, components related to the position control of the inkjet head 51 on the X-axis will be described. The drawing device 1 performs drawing in accordance with a setting mode for setting a position pertaining to the origin on the X-axis for the inkjet head when the drawing device 1 starts operating and an operation control mode for controlling operation of the inkjet head 51, the position on the X-axis of which has been adjusted on the basis of the position pertaining to the origin on the X-axis set in the setting mode.

The inkjet head 51 moves, under the control of the controller 100, along the X-axis shown in FIG. 2 (where the direction indicated by an arrow is the positive direction, and the opposite direction is the negative direction) and the Y-axis shown in FIG. 2 (where the direction indicated by an arrow is the positive direction, and the opposite direction is the negative direction). The inkjet head 51 moves from the position shown in FIG. 2 in the negative direction of the X-axis, and, when reaching above the nail of a finger placed on the finger rest 3*a* in the opening 3, draws a nail design by ejecting ink to the nail.

In order for the inkjet head 51 to accurately and promptly perform drawing on the XY plane, the drawing device 1 uses a high speed drive DC motor as a drive source for moving the inkjet head 51 along the X-axis, and employs the closed-loop control using an encoder for the position control. A first sensor 14*c* provided in the carriage 14 and the second sensor 15*c* set the position pertaining to the origin on the X-axis as a reference position for the inkjet head 51 to move along the X-axis. On the basis of the set position pertaining to the origin on the X-axis, the position of the inkjet head 51 on the X-axis is accurately controlled, so that the inkjet head 51 can draw a nail design on the drawing target, such as a nail, without misalignment. An X-axis origin sensor unit 14*a* is fixed to the carriage 14, and does not move following the carriage 15 even when the carriage 15 moves along the X-axis in relation to the carriage 14 as described below.

When the DC motor (not shown) provided in the carriage rotates, the belt 18 (shown in FIG. 3) conveys the carriage 15, to which the inkjet head 51 is attached, along the X-axis (in the left direction (negative direction) and the right direction (positive direction) when the drawing device 1 is viewed from the front). The carriage 15 moves by being guided by the guide shaft 16 extending along the X-axis. The guide shaft 16 is inserted through the insertion part 15*a* provided on the back surface of the carriage 15 as shown in FIG. 10A.

The first sensor 14*c* of the X-axis origin sensor unit 14*a* provided in the carriage 14 and the second sensor 15*c* set the position pertaining to the origin on the X-axis. The position pertaining to the origin on the X-axis may be treated as the origin position on the X-axis or as a position obtained by adding a predetermined coordinate value to the coordinate of the origin position on the X-axis. The X-axis origin sensor unit 14*a* includes: a circuit board 14*b* attached to the carriage 14; and the first sensor 14*c* connected to the circuit board 14*b*. On the circuit board 14*b*, a processing circuit that processes signals output from the first sensor 14*c* may be constructed.

The first sensor 14*c* is an optical sensor, and includes a light-emitting element 14*d* provided on a light-emitting surface and a light-receiving element 14*e* provided on a light-receiving surface that are arranged so as to face inward, namely face one another, along the Y-axis. The first sensor 14*c* is opened such that a section in the YZ plane direction is substantially U-shaped, and fixed to the carriage 14 via the circuit board 14*b* such that the opening is vertically downward. The light-emitting element 14*d* is, for example, a light source, such as an LED, and the light-receiving element 14*e* is, for example, a light-receiving sensor, such as a photodiode. In FIG. 10A, the light-emitting element 14*d* is arranged closer to the front side (side where the opening 3 is formed) of the drawing device 1, and the light-receiving element 14*e* is arranged closer to the rear side of the drawing device 1, but the light-receiving element 14*e* may be arranged closer to the front side of the drawing device 1, and the light-emitting element 14*d* may be arranged closer to the rear side of the drawing device 1.

To the back surface of the carriage 15, a light-blocking plate 15*d* is attached. The light-blocking plate 15*d* is arranged so as to pass through between the light-emitting surface and the light-receiving surface of the first sensor 14*c* when the carriage 15 moves along the X-axis. The X-axis origin sensor unit 14*a* switches the level of a pulse signal between a High level and a Low level at the reference position, which is the position at which the light-blocking plate 15*d* passes through between the light-emitting surface and the light-receiving surface of the first sensor 14*c*.

In the initial state of the setting mode, when the carriage 15 in the conveyable region 30 is located at one end of a movable range along the X-axis (the carriage 15 is located at the leftmost end in FIG. 9), the light-blocking plate 15*d* fixed to the carriage 15 is located between the light-emitting element 14*d* and the light-receiving element 14*e* of the X-axis origin sensor unit 14*a*, which is installed in the carriage 14. When the carriage 15 moves in the negative (−) direction (first direction) of the X-axis and reaches a position indicated by a broken line in FIG. 9, the light-blocking plate 15*d* passes through between the light-emitting surface and the light-receiving surface of the X-axis origin sensor unit 14*a*, so that the X-axis origin sensor unit 14*a* detects a state change from a light-blocking state to a light-receiving state. The X-axis origin sensor unit 14*a* sets the position pertaining to the origin on the X-axis on the basis of pulse output of the encoder of the second sensor 15*c* at this timing. Thereafter, in the operation control mode, by the drive of the motor provided in the carriage 14, the inkjet head 51 moves to the accurate X coordinate of the home position P1, the wiping position P2, the purging position P3, and the drawing position P4, where drawing is performed on a nail, on the basis of the set position pertaining to the origin on the X-axis.

On the back surface of the carriage 15, a circuit board 15*b* and the second sensor 15*c* that is a photointerrupter connected to the circuit board 15*b* are also provided. The circuit board 15*b* and the second sensor 15*c* constitute a linear encoder together with the encoder scale 17. On the circuit board 15*b*, a processing circuit that processes signals output from the second sensor 15*c* may be constructed.

As shown in FIG. 10A and FIG. 10B, the second sensor 15*c* is an optical sensor including a light-emitting surface and a light-receiving surface that are arranged so as to face inward, namely face one another, along the Y-axis. The optical sensor has light-emitting elements 15*e*, 15*g* provided on the light-emitting surface and light-receiving elements 15*f*, 15*h* provided on the light-receiving surface. The second sensor 15*c* (optical sensor) is attached to the circuit board 15*b* such that the encoder scale 17 is always located between the light-emitting surface and the light-receiving surface. The light-emitting element 15*e* and the light-receiving element 15*f* are arranged so as to face one another, and the light-emitting element 15*g* and the light-receiving element 15*h* are arranged so as to face one another. The light-emitting element 15*e* is, for example, a light source, such as an LED, and the light-receiving element 15*f* is, for example, a light-receiving sensor, such as a photodiode. When the inkjet head 51 moves along the X-axis to the right side in FIG. 9 (in the negative direction), namely to the left side in FIG. 1, the light-emitting element 15*g* and the light-receiving element 15*h* serve as an optical sensor that outputs an A-phase (first phase) pulse waveform (signal) LA, which is described below, and the light-emitting element 15*e* and the light-receiving element 15*f* serve as an optical sensor that outputs a B-phase (second phase) pulse waveform (signal) LB. The B phase is shifted to the left from the A phase by about ¼ of a cycle (phase difference of 90°). Similarly, when the inkjet head 51 moves along the X-axis to the left side in FIG. 9 (in the positive direction), namely to the right side in FIG. 1, the light-emitting element 15g and the light-receiving element 15h serve as the optical sensor that outputs the B-phase pulse waveform LB, and the light-emitting element 15e and the light-receiving element 15f serve as the optical sensor that outputs the A-phase pulse waveform LA. In FIG. 10A and FIG. 10B, the light-emitting element 15e is arranged closer to the front side (side where the opening 3 is formed) of the drawing device 1, and the light-receiving element 15f is arranged closer to the rear side of the drawing device 1, but the light-receiving element 15f may be arranged closer to the front side of the drawing device 1, and the light-emitting element 15e may be arranged closer to the rear side of the drawing device 1.

The encoder scale 17 is, for example, a transparent polyethylene terephthalate (PET) resin film that extends along the X-axis and on the surface of which light-blocking portions are formed at regular (e.g. 0.1 mm) intervals. Hence, the encoder scale 17 functions as a linear encoder scale in which light-transmitting portions and light-blocking portions are alternately arranged along the X-axis, and the second sensor 15c functions as a linear encoder head. When the carriage 15 moves along the X-axis, the linear encoder including the second sensor 15c outputs pulse signals. The light-receiving element 15f outputs the A-phase pulse signal that becomes the High level when light emitted from the light-emitting element 15e enters the light-receiving element 15f through a light-transmitting portion, and becomes the Low level when light emitted from the light-emitting element 15e is blocked by a light-blocking portion. The light-receiving element 15h outputs the B-phase pulse signal that becomes the High level when light emitted from the light-emitting element 15g enters the light-receiving element 15h through a light-transmitting portion, and becomes the Low level when light emitted from the light-emitting element 15g is blocked by a light-blocking portion. Hereinafter, the linear encoder is described as a two-phase linear encoder that outputs the A-phase pulse signal and the B-phase pulse signal having a phase difference of 90° from the A-phase pulse signal, but another type of linear encoder may be used.

A High level period of a pulse signal output by the light-receiving element 15f paired with the light-emitting element 15e or by the light-receiving element 15h paired with the light-emitting element 15g indicates a period during which the light-receiving element 15f and the light-emitting element 15e or the light-receiving element 15h and the light-emitting element 15g, which are included in the second sensor 15c, face one another with a light-transmitting portion of the encoder scale 17 in between while the inkjet head 51 moves along the X-axis together with the carriage 15. A Low level period of a pulse signal output by the light-receiving element 15f paired with the light-emitting element 15e or by the light-receiving element 15h paired with the light-emitting element 15g indicates a period during which the light-receiving element 15f and the light-emitting element 15e or the light-receiving element 15h and the light-emitting element 15g, which are included in the second sensor 15c, face one another with a light-blocking portion of the encoder scale 17 in between while the inkjet head 51 moves along the X-axis together with the carriage 15. Hence, the moving distance of the inkjet head 51 moving along the X-axis in one cycle of the A-phase pulse signal and the moving distance of the inkjet head 51 moving along the X-axis in one cycle of the B-phase pulse signal each correspond to the distance (length) of a pattern composed of a pair of a light-transmitting portion and a light-blocking portion formed on the encoder scale 17, and therefore the amount of movement of the carriage 15 along the X-axis can be measured by detecting the pulse signal(s).

The drawing device 1 controls the position of the inkjet head 51 on the X-axis by performing the closed-loop control on the basis of the pulse signals output from the linear encoder, taking the position pertaining to the origin on the X-axis detected by the X-axis origin sensor unit 14a as the reference position.

Figure 11A:
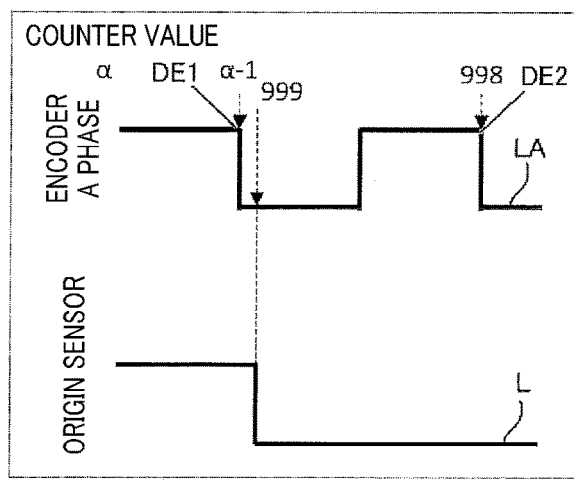
FIG. 11A and FIG. 11B are diagrams to explain a problem of position control in a conventional technology.
Figure 11B:
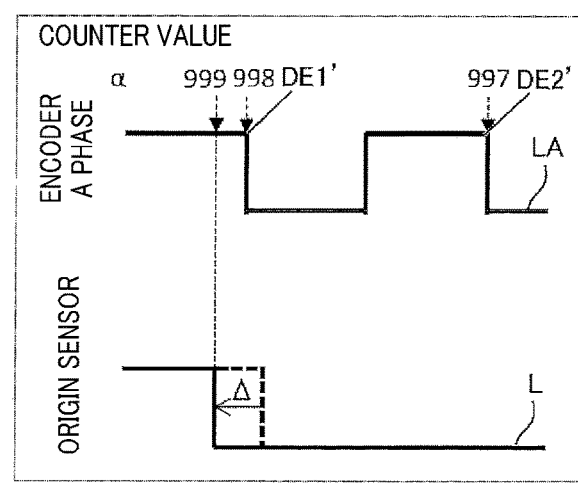
Figure 12:
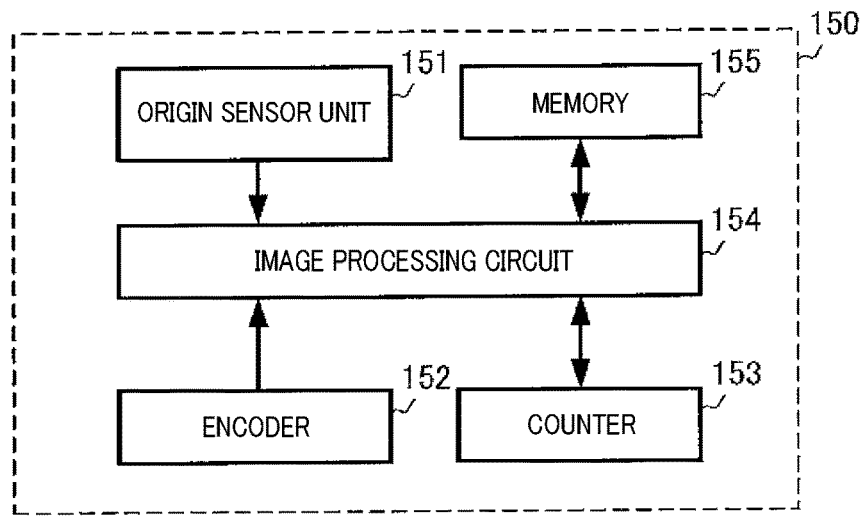
FIG. 12 shows configuration of a position detector 150.

FIG. 11A and FIG. 11B are diagrams to explain a problem of the position control in a conventional technology. FIG. 12 shows configuration of the position detector 150 according to this embodiment. It is noted that an origin sensor unit in the conventional technology uses the A-phase pulse signal only.

The closed-loop control, which is employed by the position setting device according to this embodiment for the position control of the inkjet head 51 on the X-axis, makes it possible to obtain the value of a counter (i.e. counter value) as the amount of movement of an inkjet head by counting pulses of a pulse signal output from an encoder. Further, resetting the counter value at a position pertaining to the origin on the X-axis, the position being set on the basis of a reference position detection signal output from an origin sensor unit, makes it possible to obtain the counter value as coordinate information on the position of the inkjet head on the X-axis. The position of the inkjet head corresponds to the position of its carriage on a one-to-one basis, and hence the counter value may be obtained as coordinate information on the position of the carriage.

In the conventional technology, however, as shown in FIG. 11A and FIG. 11B, when the counter value is reset at the timing at which the voltage level of an origin sensor is switched, and the origin position has changed with respect to a linear encoder scale, the coordinate information may contain an error equal to or larger than the actual change amount. FIG. 11A and FIG. 11B show the case where the origin position has changed in relation to the linear encoder scale owing to various factors, such as change in environment and aging. FIG. 11A shows signals output before the change, and FIG. 11B shows signals output after the change.

In the case shown in FIGS. 11A and 11B, the counter value is decremented at the timing at which the pulse signal output from the encoder changes from the High level to the Low level. Although this respect is the same in cases described below, the timing at which the counter value is decremented may be the timing at which the pulse signal output from the encoder changes from the Low level to the High level. Further, in the case shown in FIG. 11A and FIG. 11B, the counter value is decremented. However, the counter value may be either decremented or incremented in accordance with a moving direction in/along which the inkjet head 51 moves, and further the counter value may be decremented (or incremented) in either direction.

Before change occurs in the origin position, as shown in FIG. 11A, immediately after the edge DE1 at which the A-phase pulse signal, indicated by the line LA, output from the encoder changes from the High level to the Low level (hereinafter "falling edge"), the origin position is detected on the basis of an origin detection signal indicated by a line L, and the counter value is reset to "999". Consequently, the counter value is "998" at the next falling edge DE2 shown in FIG. 11A, and the coordinate of the pattern on the linear encoder scale corresponding to the falling edge DE2 is "998".

On the other hand, for example, after a slight change occurs in the origin position by thermal expansion or the like of at least part of a moving mechanism for the inkjet head, as shown in FIG. 11B, immediately before the falling edge DE1' of the A-phase pulse signal, the origin position is detected, and the counter value is reset to "999". Consequently, the counter value is updated to "998" at the falling edge DE1', which is immediately after the origin position is detected, and accordingly the counter value is "997" at the next falling edge DE2' shown in FIG. 11B. That is, the coordinate of the pattern on the linear encoder scale corresponding to the falling edge DE2' is "997". Thus, the value is different by 1 from the value before the change.

As described above, a position setting device of the conventional technology has a possibility that although the relative change amount Δ of the origin position (shown in FIG. 11B) is less than one cycle of the pulse signal, the coordinate information changes by about one cycle, and contains an error equal to or larger than the change amount Δ. Such an event tends to occur when the timing at which the origin position is detected is close to the timing at which the counter value is updated. As these timings are closer to one another, a smaller change in the origin position causes the event. When, for example, a drawing device that performs printing on nails uses such a position setting device having an encoder, the drawing device may have deviation therein, and draw nail designs on not nails but skin.

In order to solve such a problem, the drawing device 1 includes the position detector 150 configured as shown in FIG. 12, thereby devising the timing at which the counter value is reset. This prevents coordinate information from greatly changing/varying by a slight change in the origin position, and makes it possible to stably obtain coordinate information. That is, the above reduces variation in coordinate information, and makes it possible to obtain coordinate information with high precision.

Hereinafter, configuration and operation of the position detector 150 according to this embodiment will be described in detail. As shown in FIG. 12, the position detector 150 includes an origin sensor unit 151, an encoder 152, a counter 153, a signal processing circuit 154, and a memory 155.

Hereinafter, a case where the position detector 150 detects a position on the X-axis and obtains coordinate information thereon will be described. The position detector 150 detects at least either of positions on the X-axis and positions on the Y-axis and obtains coordinate information thereon. The position detector 150 may detect both positions on the X-axis and positions on the Y-axis and obtain coordinate information on these detected positions. When the drawing device 1 has a moving body that moves in the Z direction, the position detector 150 may detect positions in the Z direction and obtain coordinate information thereon. That is, the position detector 150 detects positions in at least one direction and obtain coordinate information on the detected positions in the direction(s).

The origin sensor unit 151 is the X-axis origin sensor unit 14a including the first sensor 14c that detects the reference position for detecting the position pertaining to the origin on the X-axis, which is one direction, for the carriage 15 or the inkjet head 51 that is moved by the carriage 15. The origin sensor unit 151 outputs, to the signal processing circuit 154, the reference position detection signal, the signal value of which switches between the High level and the Low level at the reference position.

The encoder 152 outputs the pulse signals each corresponding to the amount of movement of a moving body in one direction. More specifically, the encoder 152 is, for example, a two-phase linear encoder including the second sensor 15c and the encoder scale 17, and outputs the pulse signals each corresponding to the amount of movement of the carriage 15 along the X-axis.

The counter 153 counts pulses of the pulse signal(s) output from the encoder 152. Counting pulses means increasing or decreasing the counter value when detecting each pulse, and increasing or decreasing the counter value means adding or subtracting a certain value to or from the counter value. In this case, the counter 153 counts pulses of the A-phase pulse signal, but may count pulses of the B-phase pulse signal.

The signal processing circuit 154 resets the counter 153 on the basis of the reference position detection signal output from the origin sensor unit 151 and the pulse signals output from the encoder 152. That is, the signal processing circuit 154 changes the value of the counter 153 to an initial value. In this case, the initial value is "999". The position of the inkjet head 51 or the position of the carriage 15 at the timing of the initial value "999" is set as the position pertaining to the origin on the X-axis. The position pertaining to the origin on the X-axis may be treated as the origin position on the X-axis or as a position obtained by adding a predetermined coordinate value to the coordinate of the origin on the X-axis. The signal processing circuit 154 may be, for example, a microcomputer, and perform the abovementioned signal processing by executing a program(s).

The memory 155 stores information data indicating whether the pulse signal(s) output from the second sensor 15c is the High level or the Low level at the switching timing of the level of the reference position detection signal output from the first sensor 14c at the reference position in initial setting of setting the position pertaining to the origin (calibration).

A rising edge is an edge at which a pulse signal changes from the Low level to the High level, and a falling edge is an edge at which a pulse signal changes from the High level to the Low level.

The initial setting of setting the position pertaining to the origin is a process performed in order to secure precision of the position control. The initial setting may be performed, for example, as part of alignment between the imager 130 and the drawing unit 140 that is selectively performed in response to a user operation after the ink cartridge 50 is replaced, or may be performed when the drawing device 1 shifts from OFF state to ON state. Replacement of the ink cartridge 50 tends to generate an error in the position control because relatively large force is applied to the carriage 15 at the time, and also because individual differences exist in ink cartridges 50, for example. Expansion or contraction of the components in the drawing device 1 caused by external factors, such as temperature and humidity, in drawing by the drawing device 1 also tends to generate an error in the position control. Hence, the initial setting of setting the position pertaining to the origin performed as part of the abovementioned alignment is effective in securing precision of the position control.

In the position detector 150 thus configured, in the operation control mode, when detecting the reference position on the basis of the reference position detection signal, the signal processing circuit 154 resets the counter 153 at either a rising edge or a falling edge of the pulse signal in accordance with the relative positional relationship stored in the memory 155 in the setting mode and read from the memory 155. The relative positional relationship is a relationship between the reference position detection signal and the pulse signal in the initial setting of setting the position pertaining to the origin. Hence, the drawing device 1 can obtain stable coordinate information even when a slight change occurs in the origin position by deformation or the like of the components of the drawing device 1. The drawing device 1, which is an electronic device, therefore can realize excellent operation by preventing deviation that could occur therein. Further, the present invention is applicable to an existing electronic device only by changing signal processing performed by its signal processing circuit to that performed by the signal processing circuit 154, without changing its encoder, origin sensor unit, or the like. Hence, the above effects can be obtained at low cost.

Figure 13:
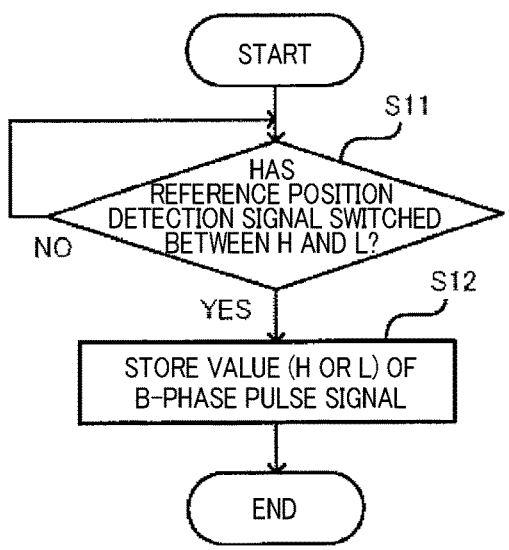
FIG. 13 is a flowchart of a counter reset process in a setting mode.
Figure 14:
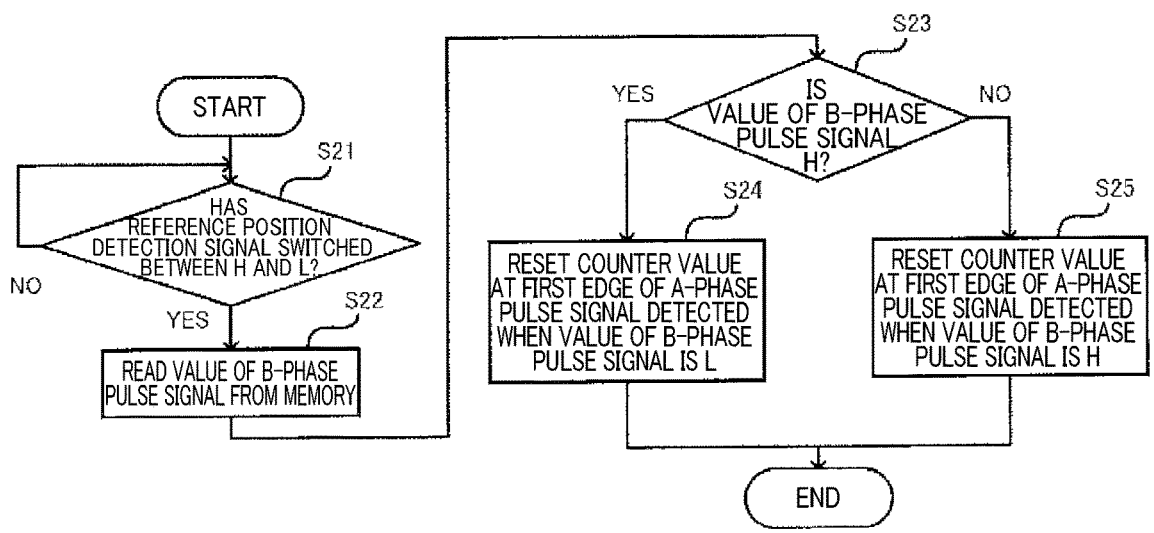
FIG. 14 is a flowchart of a counter reset process in an operation control mode.

FIG. 13 is a flowchart of a counter reset process in the setting mode (initial setting mode for setting the position pertaining to the origin). FIG. 14 is a flowchart of a counter reset process in the operation control mode (operation control mode for controlling operation of the inkjet head 51, the position of which has been adjusted on the basis of the information on the position pertaining to the origin set in the setting mode).

For example, when the ink cartridge 50 is replaced, the drawing device 1 performs the initial setting of setting the position pertaining to the origin as part of the abovementioned alignment. In the initial setting of setting the position pertaining to the origin in the X-axis direction, the drawing device 1 performs the counter reset process shown in FIG. 13.

First, in the setting mode for setting the position pertaining to the origin on the X-axis for the inkjet head 51 when the drawing device 1 starts operating, the controller 100 monitors the reference position detection signal output from the origin sensor unit 151 (Step S11). If the controller 100 detects a switch between the High level and the Low level of the reference position detection signal (Step S11; YES), the controller 100 stores, in the memory 155, the value (High level or Low level) of the B-phase pulse signal output from the encoder 152 at the time of the detection of the reference position (Step S12). The value of the B-phase pulse signal stored in the memory 155 may not be the High level or the Low level itself, but a value indicating the High level or the Low level. After Step S12, the setting mode ends.

When the setting mode ends, the mode shifts to the operation control mode. In the operation control mode, for example, when starting to draw a nail design specified by a user, the drawing device 1 performs, as part of the position control, the process shown in FIG. 14 on the basis of the result of the initial setting. The process shown in FIG. 14 is for confirming the origin position in the X-axis direction for drawing. In the operation control mode, first, the controller 100 monitors the reference position detection signal output from the origin sensor unit 151 (Step S21). If the controller 100 detects a switch between the High level and the Low level of the reference position detection signal at the reference position (Step S21; YES), the controller 100 reads the value (High level or Low level) of the B-phase pulse signal at the time of the detection of the reference position stored in the memory 155 in Step S12 (Step S22). The value of the B-phase pulse signal read from the memory 155 may not be the High level or the Low level itself, but a value indicating the High level or the Low level. Next, the controller 100 determines whether or not the value of the B-phase pulse signal read in Step S22 is the High level (Step S23).

If the controller 100 determines that the value of the B-phase pulse signal in the initial setting read from the memory 155 is the High level (Step S23; YES), the controller 100 resets the value of the counter 153 to "999", which indicates the origin position, at the first edge of the A-phase pulse signal detected after the value of the B-phase pulse signal changes to the Low level after the reading from the memory 155, wherein the A-phase pulse signal and the B-phase pulse signal keep being monitored (Step S24), thereby finishing adjustment of the origin position in the operation control mode. On the other hand, if the controller 100 determines that the value of the B-phase pulse signal read from the memory 155 is the Low level (Step S23; NO), the controller 100 resets the value of the counter 153 to "999", which indicates the origin position, at the first edge of the A-phase pulse signal detected after the value of the B-phase pulse signal changes to the High level, wherein the A-phase pulse signal and the B-phase pulse signal keep being monitored (Step S25), thereby finishing adjustment of the origin position in the operation control mode. In the operation control mode, the drawing device 1 thereafter performs drawing, taking the adjusted origin position as the origin position in the X-axis direction for the position of the inkjet head 51 or the position of the carriage 15 on the X-axis.

The operation, such as the initial setting and drawing, which is performed by moving the inkjet head 51 in the negative direction (first direction) of the X-axis in FIG. 9 will be described in detail with reference to FIG. 15A, FIG. 15B, FIG. 16A, FIG. 16B, FIG. 17A, FIG. 17B, FIG. 18A, and FIG. 18B. In the drawings, a, R, y, 5, s, . . . indicate positions of edges in the A-phase pulse signal.

Figure 15A:
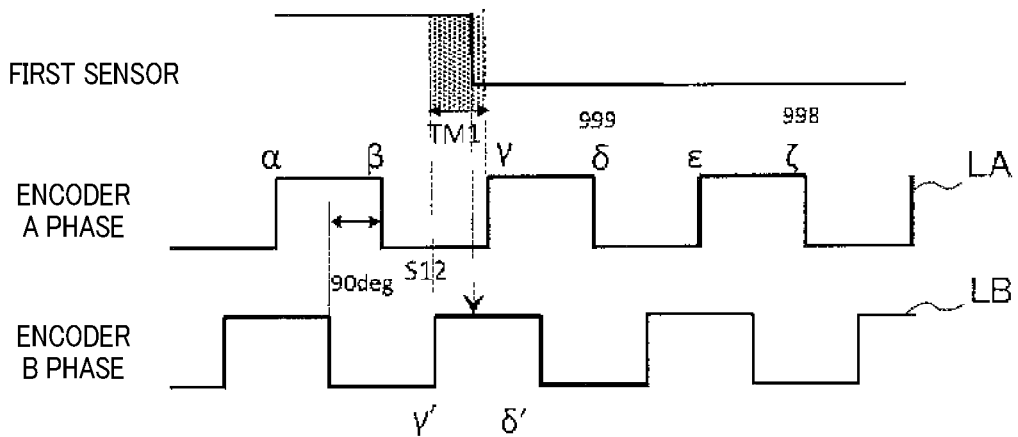
FIG. 15A and FIG. 15B show waveforms in a case where in the setting mode, an inkjet head 51 moves in a negative direction of X-axis, and a reference position detection signal switches its level at different timings, namely before and after a rising edge of an A-phase pulse signal.

In the setting mode, when the light-blocking plate 15d acting as an obstacle between the light-emitting element 14d and the light-receiving element 14e of the first sensor 14c becomes no obstacle any more accompanying the movement of the carriage 15 in the negative direction, with this position as the reference position, the reference position detection signal switches its voltage level (Step S11). As shown in FIG. 15A, when the switching timing of the voltage level of the reference position detection signal output from the first sensor 14c is in a time range TM1 and hence earlier than the rising edge y of the A-phase pulse signal, the B-phase pulse signal at the switching timing in Step S11 is the High level, and information data indicating that the value of the B-phase pulse signal is the High level is stored in the memory 155 (Step S12). The time range TM1 is a period from immediately after the rising edge y', which is an edge of the B-phase pulse signal one edge before the rising edge y of the A-phase pulse signal in terms of time, to immediately before the rising edge y of the A-phase pulse signal.

Figure 15B:
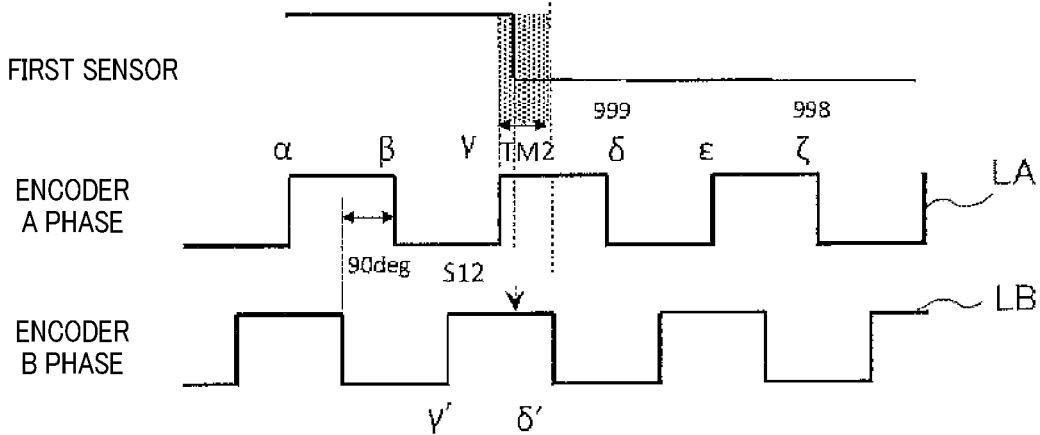

On the other hand, as shown in FIG. 15B, when the switching timing of the voltage level of the reference position detection signal output from the first sensor 14c is in a time range TM2 and hence later than the rising edge y of the A-phase pulse signal, the B-phase pulse signal at the switching timing in Step S11 is the High level, and information data indicating that the value of the B-phase pulse signal is the High level is stored in the memory 155 (Step S12). The time range TM2 is a period from immediately after the rising edge y of the A-phase pulse signal to immediately before the falling edge 5', which is an edge of the B-phase pulse signal one edge after the rising edge y of the A-phase pulse signal in terms of time. In either of the cases shown in FIG. 15A and FIG. 15B, the information data stored in the memory 155 indicates that the value of the B-phase pulse signal is the High level. Adjustment of the origin position in the operation control mode after the setting mode shown in FIG. 15A or FIG. 15B has no significant difference from that in the setting mode shown in FIG. 15A or FIG. 15B, and hence as shown in FIG. 16A or FIG. 16B.

Next, in the operation control mode, if the controller 100 detects a switch between the High level and the Low level of the reference position detection signal output at the reference position (Step S21; YES), the controller 100 reads the value (High level) of the B-phase pulse signal stored in the setting mode (Step S22), and determines that the value of the B-phase pulse signal read in Step S22 is the High level (Step S23; YES). Then, the controller 100 resets the value of the counter 153 to "999", which indicates the origin position, at the timing of the falling edge 5, which is the first edge of the A-phase pulse signal detected after the value of the B-phase pulse signal changes to the Low level after the reading from the memory 155, wherein the A-phase pulse signal and the B-phase pulse signal keep being monitored (Step S24).

Figure 16A:
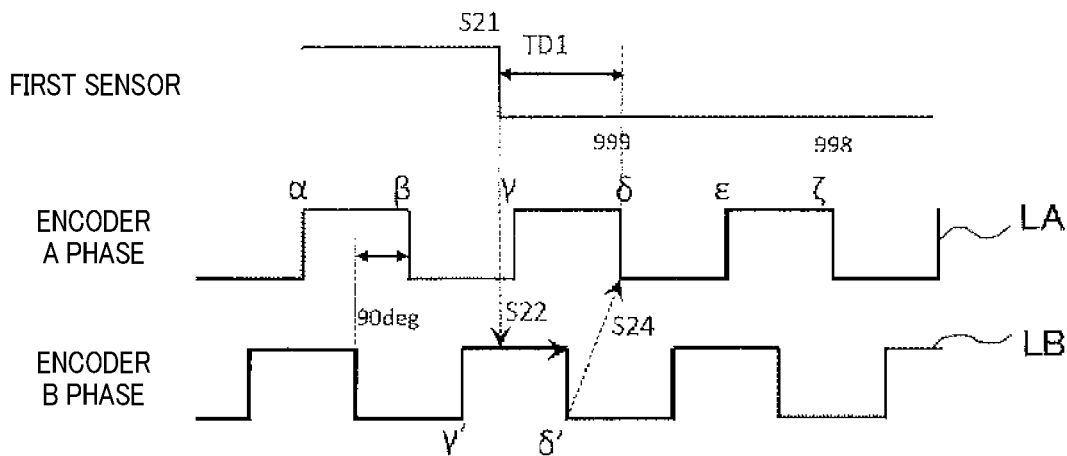
FIG. 16A and FIG. 16B show waveforms in a case where in the operation control mode, the inkjet head 51 moves in the negative direction of the X-axis, and the reference position detection signal switches its level at the different timings, namely before and after the rising edge of the A-phase pulse signal.
Figure 16B:
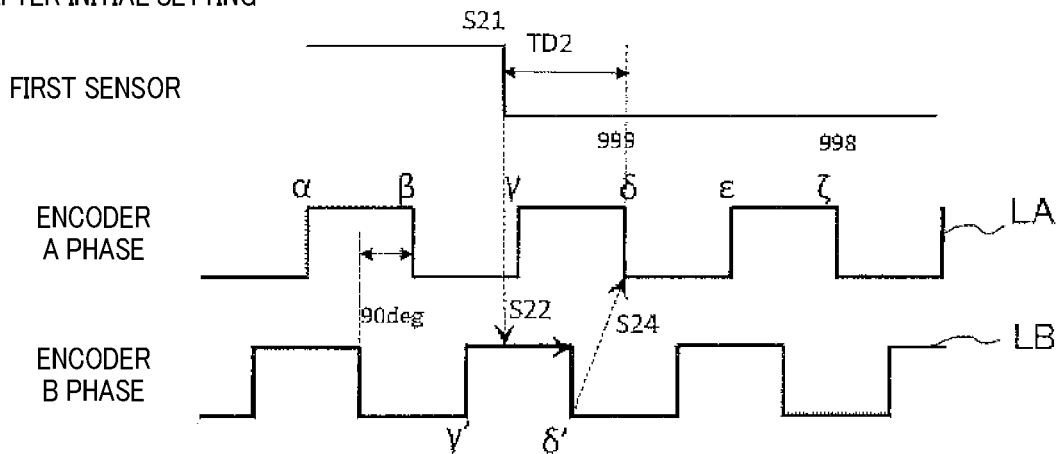

Thus, no matter whether the A-phase pulse signal is the Low level as shown in FIG. 15A or the High level as shown in FIG. 15B at the switching timing of the voltage level of the reference position detection signal output from the first sensor 14c in the setting mode, the timing of the falling edge 5 immediately after the rising edge y of the A-phase pulse signal is regarded as the timing of the origin position as shown in FIG. 16A and FIG. 16B. Hence, each time the drawing device 1 is turned on to start, the origin position is the position at the timing of the falling edge 5. The drawing device 1 therefore can perform, at accurate positions, processes in drawing and so forth performed thereafter.

In other words, no matter whether the switching timing of the voltage level of the reference position detection signal output from the first sensor 14c is after the A-phase pulse signal has fallen as shown in FIG. 15A or after the A-phase pulse signal has risen as shown in FIG. 15B, namely differs in terms of the level of the A-phase pulse signal, and accordingly no matter whether a time difference between the switching timing of the voltage level of the reference position detection signal and the timing of the origin position is a time difference TD1 as shown in FIG. 16A or a time difference TD2 as shown in FIG. 16B, namely differs, the origin position is the position at the timing of the falling edge 5.

In the above, the B-phase pulse signal is the High level at the switching timing of the voltage level of the reference position detection signal. Hereinafter, a case where the B-phase pulse signal is the Low level at the switching timing thereof will be described.

Figure 17A:
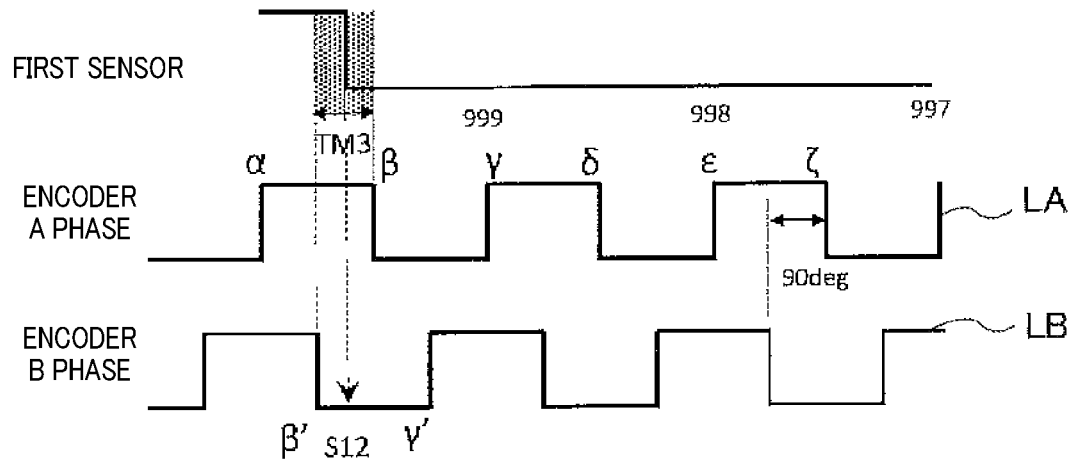
FIG. 17A and FIG. 17B show waveforms in a case where in the setting mode, the inkjet head 51 moves in the negative direction of the X-axis, and the reference position detection signal switches its level at different timings, namely before and after a falling edge of the A-phase pulse signal.

In the setting mode, when the light-blocking plate 15d acting as an obstacle between the light-emitting element 14d and the light-receiving element 14e of the first sensor 14c becomes no obstacle any more accompanying the movement of the carriage 15 in the negative direction, with this position as the reference position, the reference position detection signal switches its voltage level (Step S11). As shown in FIG. 17A, when the switching timing of the voltage level of the reference position detection signal output from the first sensor 14c is in a time range TM3 and hence earlier than the falling edge 13, of the A-phase pulse signal, the B-phase pulse signal at the switching timing in Step S11 is the Low level, and information data indicating that the value of the B-phase pulse signal is the Low level is stored in the memory 155 (Step S12). The time range TM3 is a period from immediately after the falling edge V, which is an edge of the B-phase pulse signal one edge before the falling edge 13, of the A-phase pulse signal in terms of time, to immediately before the falling edge 13, of the A-phase pulse signal.

Figure 17B:
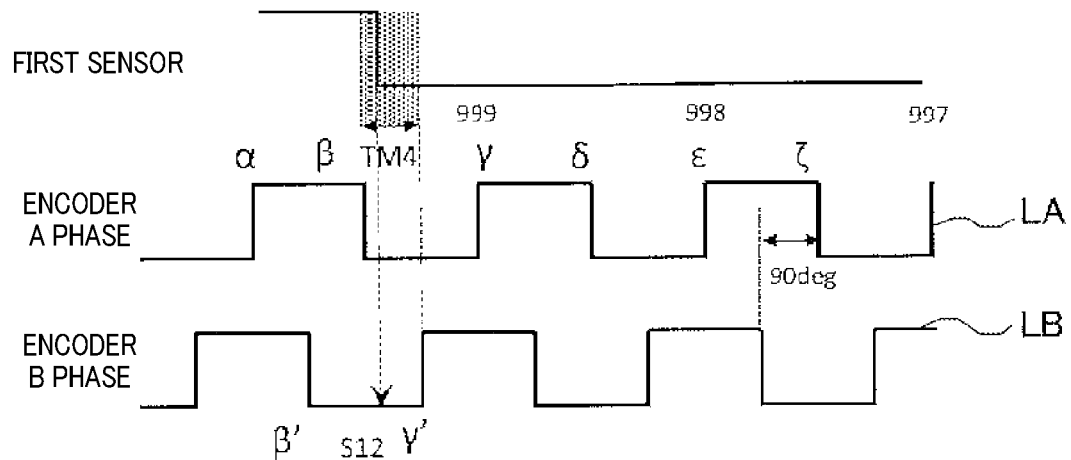

On the other hand, as shown in FIG. 17B, when the switching timing of the voltage level of the reference position detection signal output from the first sensor 14c is in a time range TM4 and hence later than the falling edge 13, of the A-phase pulse signal, the B-phase pulse signal at the switching timing in Step S11 is the Low level, and information data indicating that the value of the B-phase pulse signal is the Low level is stored in the memory 155 (Step S12). The time range TM4 is a period from immediately after the falling edge 13, of the A-phase pulse signal to immediately before the rising edge y', which is an edge of the B-phase pulse signal one edge after the falling edge 13, of the A-phase pulse signal in terms of time. In either of the cases shown in FIG. 17A and FIG. 17B, the information data stored in the memory 155 indicates that the value of the B-phase pulse signal is the Low level. Adjustment of the origin position in the operation control mode after the setting mode shown in FIG. 17A or FIG. 17B has no significant difference from that in the setting mode shown in FIG. 17A or FIG. 17B, and hence as shown in FIG. 18A or FIG. 18B.

Next, in the operation control mode, if the controller 100 detects a switch between the Low level and the High level of the reference position detection signal output at the reference position (Step S21; YES), the controller 100 reads the value (Low level) of the B-phase pulse signal stored in the setting mode (Step S22), and determines that the value of the B-phase pulse signal read in Step S22 is the Low level (Step S23; YES). Then, the controller 100 resets the value of the counter 153 to "999", which indicates the origin position, at the timing of the rising edge y, which is the first edge of the A-phase pulse signal detected after the value of the B-phase pulse signal changes to the High level after the reading from the memory 155, wherein the A-phase pulse signal and the B-phase pulse signal keep being monitored (Step S24).

Figure 18A:
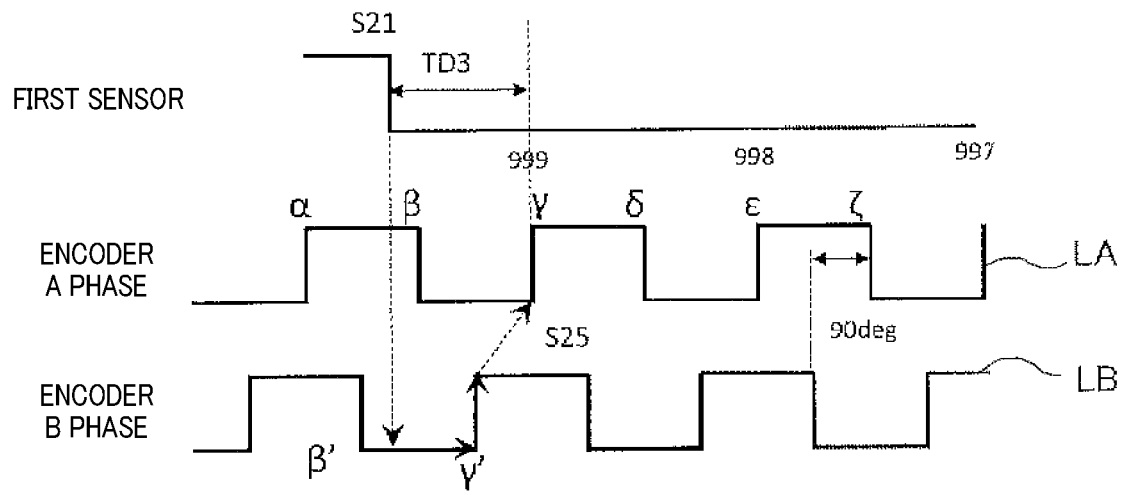
FIG. 18A and FIG. 18B show waveforms in a case where in the operation control mode, the inkjet head 51 moves in the negative direction of the X-axis, and the reference position detection signal switches its level at the different timings, namely before and after the falling edge of the A-phase pulse signal.
Figure 18B:
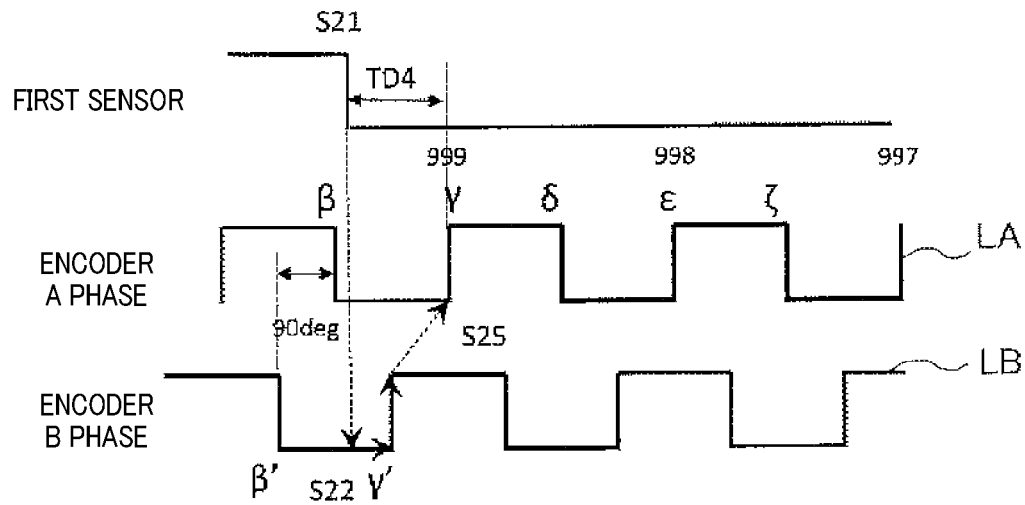

Thus, no matter whether the A-phase pulse signal is the High level as shown in FIG. 17A or the Low level as shown in FIG. 17B at the switching timing of the voltage level of the reference position detection signal output from the first sensor 14c in the setting mode, the timing of the rising edge y immediately after the falling edge 13 of the A-phase pulse signal is regarded as the timing of the origin position as shown in FIG. 18A and FIG. 18B. Hence, each time the drawing device 1 is turned on to start, the origin position is the position at the timing of the rising edge y. The drawing device 1 therefore can perform, at accurate positions, processes in drawing and so forth performed thereafter.

In other words, no matter whether the switching timing of the voltage level of the reference position detection signal output from the first sensor 14c is after the A-phase pulse signal has risen as shown in FIG. 17A or after the A-phase pulse signal has fallen as shown in FIG. 17B, namely differs in terms of the level of the A-phase pulse signal, and accordingly no matter whether a time difference between the switching timing of the voltage level of the reference position detection signal and the timing of the origin position is a time difference TD3 as shown in FIG. 18A or a time difference TD4 as shown in FIG. 18B, namely differs, the origin position is the position at the timing of the rising edge y.

In the above, the operation, such as the initial setting and drawing, performed by moving the inkjet head 51 in the negative direction (first direction) of the X-axis in FIG. 9 has been described with reference to FIG. 15A, FIG. 15B, FIG. 16A, FIG. 16B, FIG. 17A, FIG. 17B, FIG. 18A, and FIG. 18B. Hereinafter, examples of the operation, such as the initial setting and drawing, performed by moving the inkjet head 51 in the positive direction (second direction opposite to the first direction) of the X-axis in FIG. 9 will be described with reference to FIG. 19A to FIG. 19D.

In the case shown in FIG. 15A, the X-axis origin sensor unit 14a fixed to the carriage 14 is arranged close to the right end (close to the end in the positive direction) of the X-axis in FIG. 2, but in the case shown in FIG. 19A to FIG. 19D, the X-axis origin sensor unit 14a is arranged close to the left end (close to the end in the negative direction) of the X-axis in FIG. 2. The relative positional relationship between the A-phase pulse waveform LA and the B-phase pulse waveform LB shown in FIG. 19A to FIG. 19D is opposite to that shown in FIG. 15A and FIG. 15B. In the case shown in FIG. 19A to FIG. 19D, as with the case shown in FIG. 15A, the light-emitting element 15g and the light-receiving element 15h serve as the optical sensor that outputs the A-phase pulse waveform LA, and the light-emitting element 15e and the light-receiving element 15f serve as the optical sensor that outputs the B-phase pulse waveform LB, and hence the A-phase pulse waveform LA is phase-shifted to the left from the B-phase pulse waveform LB by about ¼ of a cycle (phase difference of 90°).

Figure 19A:
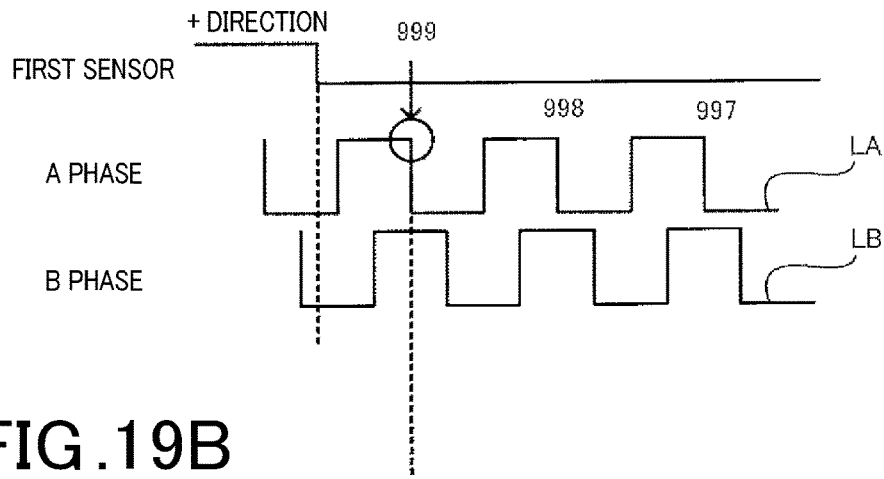
FIG. 19A to FIG. 19D show a relationship between the A-phase pulse signal, a B-phase pulse signal, and a reset position.
Figure 19B:
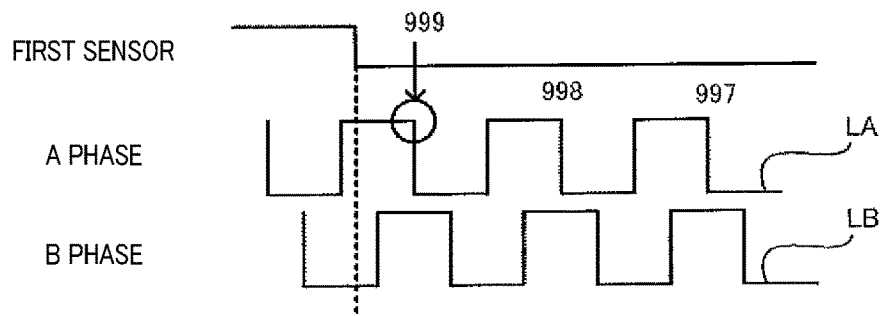
Figure 19C:
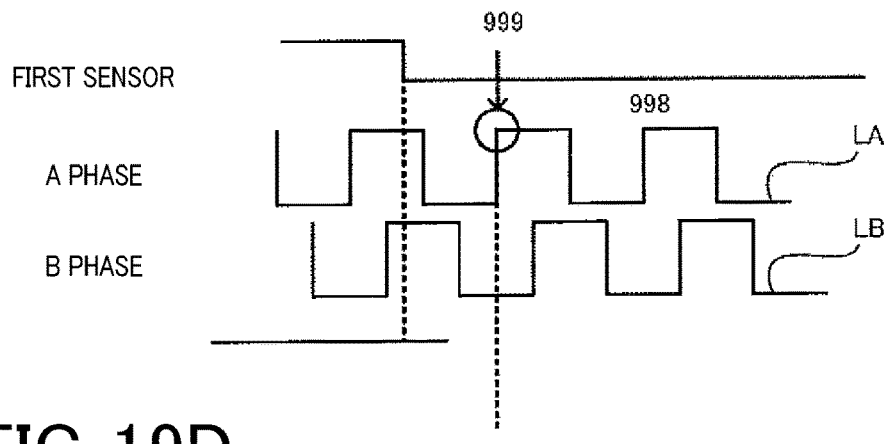
Figure 19D:
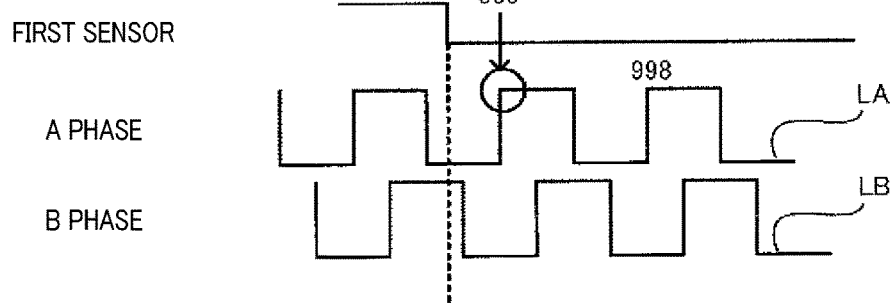

In the above embodiment, the drawing device 1 sets the origin on the X-axis according to the movement of the inkjet head 51 in the negative direction of the X-axis, but may set the origin on the X-axis according to the movement thereof in the positive direction of the X-axis. In this case, no matter whether the A-phase pulse signal is the Low level as shown in FIG. 19A or the High level as shown in FIG. 19B at the switching timing of the reference position detection signal between the High level and the Low level, always the same timing is the timing of the origin position, "999", and also no matter whether the A-phase pulse signal is the High level as shown in FIG. 19C or the Low level as shown in FIG. 19D at the switching timing of the reference position detection signal between the High level and the Low level, always the same timing is the timing of the origin position, "999".

The drawing device 1 may set a first origin on the X-axis according to the movement in the negative direction of the X-axis, and set a second origin on the X-axis according to the movement in the positive direction of the X-axis.

In this case, the drawing device 1 includes the second sensor 15c including: the light-emitting element 15g and the light-receiving element 15h serving as a first phase sensor that outputs a first phase signal; and the light-emitting element 15e and the light-receiving element 15f serving as a second phase sensor that outputs a second phase signal.

In a first setting mode of the setting mode, the controller 100 stores information data indicating the level of the second phase signal of the second phase sensor at the time when the first sensor 14c detects the reference position while the inkjet head 51 (or carriage 15) is moving in the first direction (negative direction) along the X-axis. In a first operation control mode of the operation control mode, the controller 100 sets, as the position pertaining to the first origin on the X-axis, the position of the first (earliest) edge of the first phase after the second phase signal of the second phase sensor switches from the same level as (level identical with) the level of the second phase signal indicated by the information data stored in the first setting mode to a different level after the first sensor 14c detects the reference position while the inkjet head 51 is moving in the first direction. In a second setting mode of the setting mode, the controller 100 stores information data indicating the level of the first phase signal of the first phase sensor at the time when the first sensor 14c detects the reference position while the inkjet head 51 is moving in the second direction (positive direction) opposite to the first direction along the X-axis. In a second operation control mode of the operation control mode, the controller 100 sets, as the position pertaining to the second origin on the X-axis, the position of the first (earliest) edge of the second phase after the first phase signal of the first phase sensor switches from the same level as (level identical with) the level of the first phase signal indicated by the information data stored in the second setting mode to a different level after the first sensor 14c detects the reference position while the inkjet head 51 is moving in the second direction.

The above embodiment is given as a specific example for facilitating understanding of the present invention, and hence the present invention is not limited to the embodiment. The electronic device, the operation method, and the recording medium storing the program(s) can be variously modified or changed without departing from the scope of claims below.

Although in the above embodiment, a nail printer is cited as an example of the electronic device, the electronic device is not limited to a nail printer and may be any device as long as the device performs position control using an encoder and an origin sensor unit.

Further, although in the above embodiment, a linear encoder is used as an example of the encoder, the encoder is not limited to a linear encoder and may be another type of encoder, such as a rotary encoder.

Further, although in the above embodiment, a photointerrupter is used as an example of the position sensor used in each of the encoder and the origin sensor unit, the optical sensor used in each of the encoder and the origin sensor unit is not limited to a photointerrupter and may be another type of optical sensor, such as a photoreflector. The position sensor used in each of the encoder and the origin sensor unit is not even limited to an optical sensor and may be another type of sensor, such as a magnetic sensor.

Although in the above embodiment, a method of utilizing the B-phase pulse signal is cited as an example of the method of determining the reset edge, the method of determining the reset edge is not limited thereto. The method of determining the reset edge using the B-phase pulse signal requires only a one-bit storage region for storing information data indicating that the value of the B-phase pulse signal is the High level (e.g. a value of "1") or information data indicating that the value of the B-phase pulse signal is the Low level (e.g. a value of "0"), and accordingly has an effect of not using much of the storage capacity. However, another method, such as a method of determining the nearest edge and the reset edge using a timer, may be employed.

Further, although the programs are stored in the storage 160, they may be stored in, other than the abovementioned RAM and ROM, a removable recording/storage medium, such as a USB flash memory, a CD (Compact Disc), or a DVD (Digital Versatile Disc).

The present invention is not limited to the above embodiment(s), and can be variously modified in the practical phase without departing from the scope of the present invention. Further, the embodiments may be appropriately combined and implemented. In this case, combined effects are obtained. Still further, the embodiments include various inventions that can be extracted by, from disclosed elements, selecting some of the disclosed elements and combining the same. For example, even if some elements are removed from all the elements disclosed in the embodiment(s), a configuration or structure made by removing the elements may be extracted as an invention as long as it can achieve at least one object and obtain at least one effect.

What is claimed is:
1. An electronic device comprising:
   a moving body that moves along a first axis;
   a first sensor that is fixed to a point corresponding to a reference position on the first axis, and detects that the moving body has passed the reference position while moving along the first axis;

a second sensor that is disposed so as to move as the moving body moves, and includes a first component and a second component that detect an amount of movement of the moving body from the reference position along the first axis as a first rectangular signal and a second rectangular signal phase-shifted from the first rectangular signal, respectively; and a processor that:
  in a setting mode, stores setting data indicating whether a level of the second rectangular signal detected by the second component of the second sensor at a time when the first sensor detects that the moving body has passed the reference position is a high level or a low level; and
  in an operation control mode, sets, as a position pertaining to an origin on the first axis, a position where a level of the first rectangular signal detected by the first component of the second sensor switches first after the first sensor detects that the moving body has passed the reference position and after the second rectangular signal detected by the second component of the second sensor switches from a level identical with the level indicated by the setting data to a different level.

2. The electronic device according to claim 1, wherein the second rectangular signal has a phase difference of substantially 90 degrees from the first rectangular signal.

3. The electronic device according to claim 1,
wherein the setting mode includes a first setting mode and a second setting mode, and the operation control mode includes a first operation control mode and a second operation control mode, and
wherein the processor:
  in the first setting mode, stores first setting data indicating whether a level of the second rectangular signal detected by the second component of the second phase sensor at a time when the first sensor detects that the moving body has passed the reference position, the moving body moving in a first direction along the first axis, is a high level or a low level;
  in the first operation control mode, sets, as a position pertaining to a first origin on the first axis, a position where a level of the first rectangular signal detected by the first component of the second sensor switches first after the first sensor detects that the moving body has passed the reference position, the moving body moving in the first detection, and after the second rectangular signal detected by the second component of the second sensor switches from a level identical with the level indicated by the first setting data to a different level;
  in the second setting mode, stores second setting data indicating whether a level of the first rectangular signal detected by the first component of the second sensor at a time when the first sensor detects that the moving body has passed the reference position, the moving body moving in a second direction opposite to the first direction along the first axis, is a high level or a low level; and
  in the second operation control mode, sets, as a position pertaining to a second origin on the first axis, a position where a level of the second rectangular signal detected by the second component of the second sensor switches first after the first sensor detects that the moving body has passed the reference position, the moving body moving in the second detection, and after the first rectangular signal detected by the first component of the second sensor switches from a level identical with the level indicated by the second setting data to a different level.

4. The electronic device according to claim 1,
wherein the moving body has an inkjet head that moves along the first axis and a direction that intersects with the first axis, and
wherein the electronic device proceeds to the setting mode in response to replacement of an ink cartridge or starting-up of the electronic device.

5. An operation method that is performed in an electronic device including: a moving body that moves along a first axis; a first sensor that is fixed to a point corresponding to a reference position on the first axis, and detects that the moving body has passed the reference position while moving along the first axis; and a second sensor that is disposed so as to move as the moving body moves, and includes a first component and a second component that detect an amount of movement of the moving body from the reference position along the first axis as a first rectangular signal and a second rectangular signal phase-shifted from the first rectangular signal, respectively, the operation method comprising:
  in a setting mode, storing setting data indicating whether a level of the second rectangular signal detected by the second component of the second sensor at a time when the first sensor detects that the moving body has passed the reference position is a high level or a low level; and
  in an operation control mode, setting, as a position pertaining to an origin on the first axis, a position where a level of the first rectangular signal detected by the first component of the second sensor switches first after the first sensor detects that the moving body has passed the reference position and after the second rectangular signal detected by the second component of the second sensor switches from a level identical with the level indicated by the setting data to a different level.

6. A non-transitory computer-readable recording medium storing a program executable by a processor of an electronic device including: a moving body that moves along a first axis; a first sensor that is fixed to a point corresponding to a reference position on the first axis, and detects that the moving body has passed the reference position while moving along the first axis; and a second sensor that is disposed so as to move as the moving body moves, and includes a first component and a second component that detect an amount of movement of the moving body from the reference position along the first axis as a first rectangular signal and a second rectangular signal phase-shifted from the first rectangular signal, respectively, the program allowing the processor to:
  in a setting mode, store setting data indicating whether a level of the second rectangular signal detected by the second component of the second sensor at a time when the first sensor detects that the moving body has passed the reference position is a high level or a low level; and
  in an operation control mode, set, as a position pertaining to an origin on the first axis, a position where a level of the first rectangular signal detected by the first component of the second sensor switches first after the first sensor detects that the moving body has passed the reference position and after the second rectangular signal detected by the second component of the second sensor switches from a level identical with the level indicated by the setting data to a different level.

* * * * *

UNITED STATES PATENT AND TRADEMARK OFFICE
CERTIFICATE OF CORRECTION

PATENT NO. : 11,203,209 B2
APPLICATION NO. : 16/803605
DATED : December 21, 2021
INVENTOR(S) : Tomoyuki Nagao It is certified that error appears in the above-identified patent and that said Letters Patent is hereby corrected as shown below:

In the Claims

Claim 3, Column 21, Line 39, after "second" delete "phase".

Signed and Sealed this
Twelfth Day of July, 2022

Katherine Kelly Vidal
*Director of the United States Patent and Trademark Office*